(12) United States Patent
Boudreau et al.

(10) Patent No.: US 6,233,532 B1
(45) Date of Patent: May 15, 2001

(54) SENSOR ASSEMBLY

(75) Inventors: Paul Boudreau, Grafton; Curt Jarva, Norwell, both of MA (US)

(73) Assignee: Dover Associates, Inc., Grafton, MA (US)

( * ) Notice: Subject to any disclaimer, the term of this patent is extended or adjusted under 35 U.S.C. 154(b) by 0 days.

(21) Appl. No.: 09/007,235

(22) Filed: Jan. 14, 1998

(51) Int. Cl.⁷ .................................................. G05B 19/00
(52) U.S. Cl. ........................ 702/89; 700/67; 340/870.9
(58) Field of Search ................................ 341/61, 50, 110; 340/870.05, 870.32, 310.01; 324/678; 702/89; 700/67

(56) References Cited

U.S. PATENT DOCUMENTS

| | | | |
|---|---|---|---|
| 4,694,244 | 9/1987 | Whiteside et al. | 324/121 R |
| 4,749,986 | 6/1988 | Otani et al. | 340/587 |
| 4,827,259 | 5/1989 | Murphy et al. | 341/123 |
| 5,010,507 | 4/1991 | Kenny | 364/724.01 |
| 5,038,365 | 8/1991 | Belloc et al. | 375/8 |
| 5,072,358 | 12/1991 | Lankford | 364/178 |
| 5,170,387 | 12/1992 | Groen | 369/59 |
| 5,327,125 | 7/1994 | Iwase et al. | 341/61 |
| 5,416,480 | 5/1995 | Roach et al. | 341/61 |
| 5,485,400 | * 1/1996 | warrior et al. | 702/127 |

* cited by examiner

Primary Examiner—Kamini Shah
(74) Attorney, Agent, or Firm—Pandiscio & Pandiscio

(57) ABSTRACT

A sensor assembly and a method for sensing physical conditions and reporting on the same are disclosed. The sensor assembly comprises an electronic sensor, a dedicated signal conditioner and a dedicated ADC, all integrated directly with the electronic sensor into a single pre-assembled and pre-calibrated package. The sensor assembly also comprises transponder apparatus for enabling the sensor assembly to adapt its output signal so as to properly match the specific input requirements of a particular digital controller. More particularly, the sensor assembly's transponder apparatus is constructed so as to measure the time duration of a programming pulse sent to the sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller.

24 Claims, 14 Drawing Sheets

SENSOR ASSEMBLY

FIELD OF THE INVENTION

This invention relates to electronic devices in general, and more particularly to electronic sensors for sensing various physical conditions and reporting on the same.

BACKGROUND OF THE INVENTION

Electronic sensors are well known in the art for sensing various physical conditions and reporting on the same. By way of example but not limitation, electronic sensors have been developed for sensing temperature, pressure, flow, strain, voltage, current, pH, gases, vibration, light, humidity, motion and the like.

The typical electronic sensor is generally constructed so as to provide a low-level, un-calibrated analog output. In most situations, the output of the electronic sensor must generally be used by a digital controller which is in turn connected to various digital computer control equipment. Thus, it is generally necessary to provide an interface between the electronic sensor and the digital controller so as to properly transform the electronic sensor's analog output signal into a corresponding digital signal which may then be used as an input for the digital controller.

More particularly, FIG. 1 shows a typical prior art construction for connecting the output of an electronic sensor 5 to a digital controller 10. The low-level, un-calibrated analog output of digital sensor 5 is first passed to a signal conditioner 15, where the analog output signal is amplified to a more robust, and hence usable, level. Next, this amplified analog signal is passed to an analog-to-digital converter (or "ADC") 20, where the analog signal is converted into a corresponding digital signal. Finally, this digital signal is passed to digital controller 10, which is in turn connected to digital computer control equipment 25. In this way, the analog output signal generated by electronic sensor 5 may be monitored by digital computer control equipment 25.

Many different types of electronic sensors 5, and many different types of digital controllers 10, are currently available on the market. Thus, with the sort of construction shown in FIG. 1, the user must generally specify, purchase and calibrate the specific signal conditioner 15, and the specific ADC 20, which will be used to convert the low-level, un-calibrated analog output signal provided by electronic sensor 5 into the sort of digital input signal usable by digital controller 10. This process of specification, purchase and calibration generally involves significant time and expense.

In addition to the foregoing, since each independent (or "stand-alone") component in an electronic system is generally characterized by a limited degree of accuracy, the need to position multiple independent components between electronic sensor 5 and digital controller 10 tends to undermine the overall accuracy of the sensor data being reported to digital controller 10. In other words, if a specific stand-alone signal conditioner 15 has an error range of + or –2%, and a specific stand-alone ADC 20 has an error range of + or –2%, a signal passing through those two stand-alone elements will have an error range of + or –4%. Furthermore, since wiring and/or other electrical connectors must generally be used to electrically interconnect stand-alone signal conditioner 15 and stand-alone ADC 20 between electronic sensor 5 and digital controller 10, still other inaccuracies may be introduced into the overall system through the use of stand-alone signal conditioners and stand-alone ADC's.

Currently, digital controller 10 might comprise a so-called "custom" controller, or it might comprise a so-called programmable logic control (or "PLC"), or it might comprise a so-called "micro-PLC". Some custom controllers and some PLC's are constructed so as to incorporate a dedicated ADC directly into the digital controller, whereby the digital controller can accept direct analog inputs. However, other custom controllers, other PLC's, and all of the micro-PLC's currently available on the market are constructed so that they do not incorporate a stand-alone ADC directly into the digital controller. In this situation, the digital controller cannot accept direct analog inputs, and a construction similar to that shown in FIG. 1 must generally be used to connect electronic sensor 5 to digital controller 10.

The present invention is directed to this latter situation, and particularly (but not exclusively) to the situation where digital controller 10 comprises a micro-PLC device.

A further consideration for the present invention relates to the fact that many electronic sensors must necessarily be deployed in harsh and/or hazardous environments. As a result, many of these electronic sensors must periodically be replaced with new electronic sensors. Such sensor replacement typically requires that the old electronic sensor be disconnected from the remainder of the system, the new electronic sensor connected up, and then the new electronic sensor properly calibrated with the remainder of the system. Unfortunately, this replacement process can be inconvenient and time-consuming with system constructions such as that shown in FIG. 1.

OBJECTS OF THE INVENTION

Accordingly, one object of the present invention is to provide a novel sensor assembly which addresses the foregoing problems.

Another object of the present invention is to provide a novel sensor assembly in which a dedicated signal conditioner and a dedicated ADC are integrated directly with an electronic sensor into a single pre-assembled and pre-calibrated package.

And another object of the present invention is to provide a novel sensor assembly in which the sensor assembly can adapt its output signal so as to properly match the specific requirements of a particular digital controller.

Still another object of the present invention is to provide a novel sensor assembly which can help reduce overall system development time and cost, and which can increase overall system accuracy.

Yet another object of the present invention is to provide a novel sensor assembly which can be used in conjunction with a digital controller which comprises a micro-PLC device.

Another object of the present invention is to provide a novel sensor assembly which is adapted so that it can be quickly and conveniently replaced by a like sensor assembly.

And another object of the present invention is to provide a novel sensor assembly which can incorporate electronic sensors for sensing a wide variety of different physical conditions including, but not limited to, temperature, pressure, flow, strain, voltage, current, pH, gases, vibration, light, humidity, motion and the like.

Still another object of the present invention is to provide a novel sensor assembly in which at least a portion of the sensor assembly is incorporated into the cabling connecting the electronic sensor to the digital controller.

Yet another object of the present invention is to provide an improved method for sensing physical conditions and reporting on the same.

And another object is to provide an improved method for sensing physical conditions and reporting on the same, wherein the method remains the same regardless of the particular physical condition which is being sensed and the type of sensor used to sense the same.

SUMMARY OF THE INVENTION

These and other objects are addressed by the present invention, which comprises a novel sensor assembly and a novel method for sensing physical conditions and reporting on the same.

In one form of the invention, the novel sensor assembly comprises an electronic sensor, a dedicated signal conditioner and a dedicated ADC, all integrated directly with the electronic sensor into a single pre-assembled and pre-calibrated package.

Preferably the novel sensor assembly also comprises novel transponder apparatus for enabling the sensor assembly to adapt its output signal so as to properly match the specific input requirements of a particular digital controller. The sensor assembly's novel transponder apparatus preferably is constructed so as to measure the time duration of a programming pulse sent to the sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller.

In a preferred form of the invention, the CPP is sent to the sensor assembly by the digital controller.

And in a preferred form of the invention, the novel sensor assembly is constructed so that it will generate its SRP according to the following algorithm:

time duration of $SRP$=(Actual Sensed Value/Full Scale Sensed Value)*time duration of $CPP$ Thus, by measuring the time duration of the SRP and comparing it to the time duration of the CPP, the digital controller can determine the ratio of the sensor assembly's actual sensed value to the sensor assembly's full scale sensed value, and hence determine the sensor's actual sensed data.

And in a preferred form of the invention, the sensor assembly's novel transponder apparatus is constructed so as to (1) first confirm safe receipt of the CPP by sending a sensor confirmation pulse (or "SCP") to the digital controller upon safe receipt of the CPP, and (2) thereafter generate the SRP to report sensor data to the digital controller.

In one form of the invention, the novel method for sensing physical conditions and reporting on the same comprises:

(1) providing a novel sensor assembly comprising an electronic sensor, a dedicated signal conditioner and a dedicated ADC, all integrated directly with the electronic sensor into a single pre-assembled and pre-calibrated package, wherein the novel sensor assembly also comprises novel transponder apparatus for enabling the sensor assembly to adapt its output signal to match the specific input requirements of a particular digital controller, with the sensor assembly's novel transponder apparatus being constructed so as to measure the time duration of a programming pulse sent to the sensor assembly (the CPP), and then to use the time duration of the CPP to generate a time-proportioned reporting pulse (the SRP) so as to report sensor data to the digital controller;

(2) sending the CPP to the sensor assembly, and sensing the physical condition which is to be measured by the sensor assembly; and (3) sending the SRP from the sensor assembly to the digital controller so as to report sensor data to the digital controller.

In a preferred form of the method, the CPP is sent to the sensor assembly by the digital controller.

And in a preferred form of the method, the novel sensor assembly is constructed so that it will generate its SRP according to the following algorithm:

time duration of $SRP$=(Actual Sensed Value/Full Scale Sensed Value)*time duration of $CPP$ And in a preferred form of the method, the sensor assembly's novel transponder apparatus is constructed so as to (1) first confirm safe receipt of the CPP by sending a sensor confirmation pulse (the SCP) to the digital controller upon safe receipt of the CPP, and (2) thereafter generate the SRP to report sensor data to the digital controller.

In another form of the invention, there is provided a novel electronic system comprising (i) a sensor assembly, the sensor assembly comprising an electronic sensor; a dedicated signal conditioner; and a dedicated analog-to-digital converter ("ADC"); the dedicated signal conditioner and the ADC being integrated directly with the electronic sensor into a single pre-assembled and pre-calibrated package; and (ii) a digital controller.

And in another form of the invention, there is provided a novel method for sensing physical conditions and reporting on the same, the method comprising:

(1) providing an electronic system comprising (i) a sensor assembly, the sensor assembly comprising an electronic sensor; a dedicated signal conditioner; and a dedicated analog-to-digital converter ("ADC"); the dedicated signal conditioner and the ADC being integrated directly with the electronic sensor into a single pre-assembled and pre-calibrated package; and (ii) a digital controller;

(2) sensing the physical condition which is to be measured by the sensor assembly; and (3) sending an output signal from the sensor assembly to the digital controller so as to report sensor data to the digital controller.

In another form of the invention, there is provided a novel sensor assembly comprising (i) an electronic sensor adapted to sense a physical condition and to provide a first signal representative of the sensed physical condition, the first signal comprising a low-level, un-calibrated analog signal; and (ii) an electronic device adapted to receive the first signal and to provide a second signal representative of the first signal, the second signal comprising a high-level, calibrated digital signal of the sort required by a digital controller; the electronic sensor and the electronic device being integrated with one another into a single pre-assembled and pre-calibrated package.

And in another form of the invention, there is provided a novel method for sensing physical conditions and reporting on the same, the method comprising:

(1) providing a sensor assembly comprising (i) an electronic sensor adapted to sense a physical condition and to provide a first signal representative of the sensed physical condition, the first signal comprising a low-level, un-calibrated analog signal; and (ii) an electronic device adapted to receive the first signal and to provide a second signal representative of the first signal, the second signal comprising a high-level, calibrated digital signal of the sort required by a digital controller; the electronic sensor and the electronic device being integrated with one another into a single pre-assembled and pre-calibrated package;

(2) sensing the physical condition which is to be measured by the sensor assembly; and (3) sending the second signal from the sensor assembly to the digital controller so as to report sensor data to the digital controller.

In still another form of the invention, there is provided a novel sensor assembly comprising (i) an electronic sensor adapted to sense a physical condition and to provide a first signal representative of the sensed physical condition, the first signal comprising a low-level, un-calibrated analog signal; and (ii) a cable assembly, the cable assembly comprising (a) an electronic device adapted to receive the first signal and to provide a second signal representative of the first signal, the second signal comprising a high-level, calibrated digital signal of the sort required by a digital controller; (b) a first connector for connecting the electronic device to the electronic sensor; and (c) a second connector for connecting the electronic device to a digital controller; the electronic device being integrated with the first and second connectors into a single pre-assembled and pre-calibrated package.

And in another form of the invention, there is provided a novel method for sensing physical conditions and reporting on the same, the method comprising:

(1) providing a sensor assembly comprising (i) an electronic sensor adapted to sense a physical condition and to provide a first signal representative of the sensed physical condition, the first signal comprising a low-level, un-calibrated analog signal; and (ii) a cable assembly, the cable assembly comprising (a) an electronic device adapted to receive the first signal and to provide a second signal representative of the first signal, the second signal comprising a high-level, calibrated digital signal of the sort required by a digital controller; (b) a first connector for connecting the electronic device to the electronic sensor; and (c) a second connector for connecting the electronic device to a digital controller; the electronic device being integrated with the first and second connectors into a single pre-assembled and pre-calibrated package;

(2) sensing the physical condition which is to be measured by the sensor assembly; and (3) sending the second signal from the sensor assembly to the digital controller so as to report sensor data to the digital controller.

In another form of the invention, there is provided a novel cable assembly for use with an electronic sensor of the sort adapted to sense a physical condition and to provide a first signal representative of the sensed physical condition, the first signal comprising a low-level, un-calibrated analog signal, the cable assembly comprising (i) an electronic device adapted to receive the first signal and to provide a second signal representative of the first signal, the second signal comprising a high-level, calibrated digital signal of the sort required by a digital controller; (ii) a first connector for connecting the electronic device to the electronic sensor; and (iii) a second connector for connecting the electronic device to a digital controller; the electronic device being integrated with the first and second connectors into a single pre-assembled and pre-calibrated package.

And in another form of the invention, there is provided a novel method for sensing physical conditions and reporting on the same, the method comprising:

(1) providing a cable assembly for use with an electronic sensor of the sort adapted to sense a physical condition and to provide a first signal representative of the sensed physical condition, the first signal comprising a low-level, un-calibrated analog signal, the cable assembly comprising (i) an electronic device adapted to receive the first signal and to provide a second signal representative of the first signal, the second signal comprising a high-level, calibrated digital signal of the sort required by a digital controller; (ii) a first connector for connecting the electronic device to the electronic sensor; and (iii) a second connector for connecting the electronic device to a digital controller; the electronic device being integrated with the first and second connectors into a single pre-assembled and pre-calibrated package;

(2) connecting the cable assembly to the electronic sensor and to the digital controller and sensing the physical condition which is to be measured by the sensor assembly; and (3) sending the second signal from the sensor assembly to the digital controller so as to report sensor data to the digital controller.

And in another form of the invention, there is provided a novel sensor assembly comprising a sensor adapted to sense a physical condition and to provide a first signal representative of the sensed physical condition; and a device adapted to receive the first signal and to provide a second signal representative of the first signal, the device including transponder apparatus for enabling the device to configure the second signal so as to properly match the specific input requirements of a host connected to the sensor assembly.

BRIEF DESCRIPTION OF THE DRAWINGS

Still other objects and features of the present invention will be more fully disclosed or rendered obvious by the following detailed description of the preferred embodiments of the invention, which are to be considered together with the accompanying drawings wherein like numbers refer to like parts and further wherein.

DETAILED DESCRIPTION OF THE PREFERRED EMBODIMENTS

Figure 1:
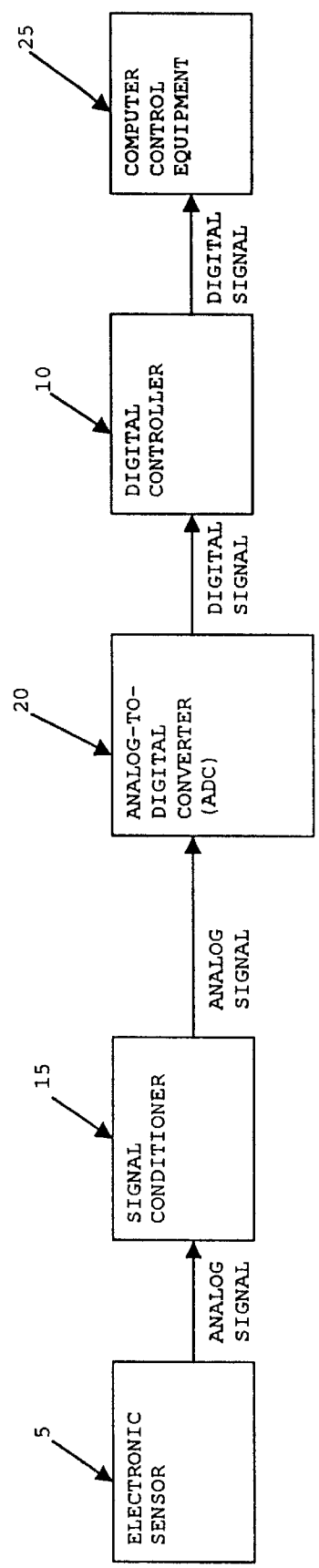
FIG. 1 is a schematic diagram illustrating a common prior art construction for connecting an electronic sensor to digital computer control equipment.
Figure 2:
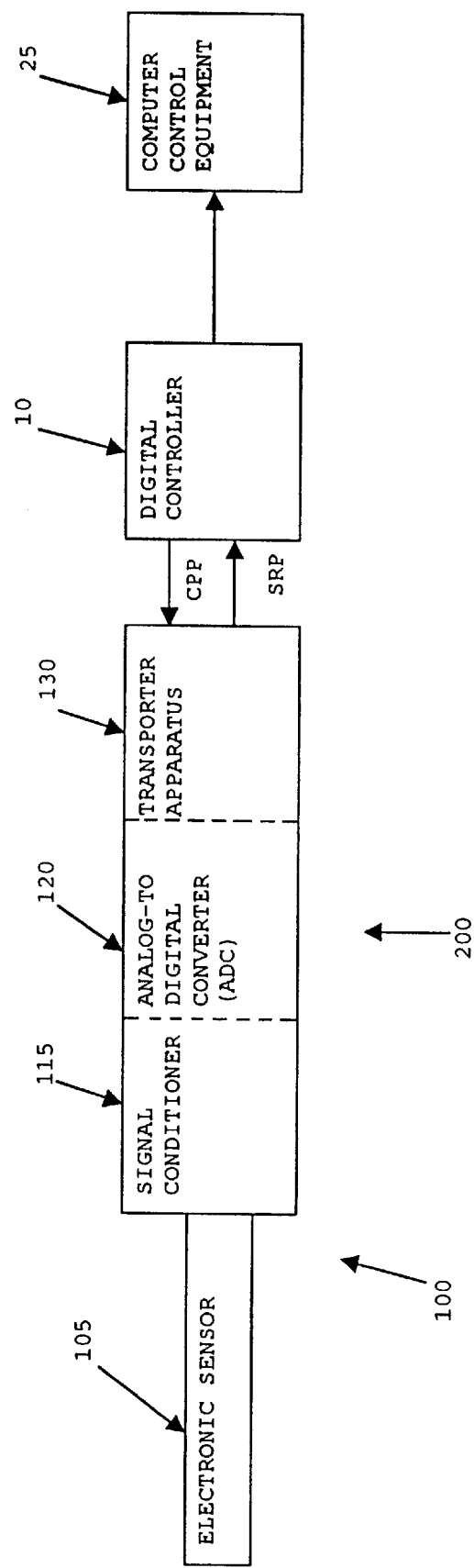
FIG. 2 is a schematic diagram illustrating a novel sensor assembly constructed in accordance with the present invention, with the novel sensor assembly being shown connected to a digital controller, and with the digital controller being shown connected to digital computer control equipment.

Looking next at FIG. 2, there is shown a novel sensor assembly 100 formed in accordance with the present invention. Sensor assembly 100 generally comprises an electronic sensor 105, a dedicated signal conditioner 115 and a dedicated ADC 120, all integrated directly into a single pre-assembled and pre-calibrated package.

Sensor assembly 100 also preferably comprises novel transponder apparatus 130 for enabling sensor assembly 100 to adapt its output signal so as to properly match the specific input requirements of a particular digital controller 10 to which sensor assembly 100 may be connected. More particularly, the sensor assembly's novel transponder apparatus 130 is preferably constructed so as to measure the time duration of a controller programming pulse (i.e., the aforementioned CPP) sent to the sensor assembly by digital controller 10, and then to use the time duration of the CPP to generate a time-proportioned reporting pulse (i.e., the aforementioned SRP) so as to report sensor data to digital controller 10. Digital controller 10 can then report this sensor data to computer control equipment 25.

Figure 3:
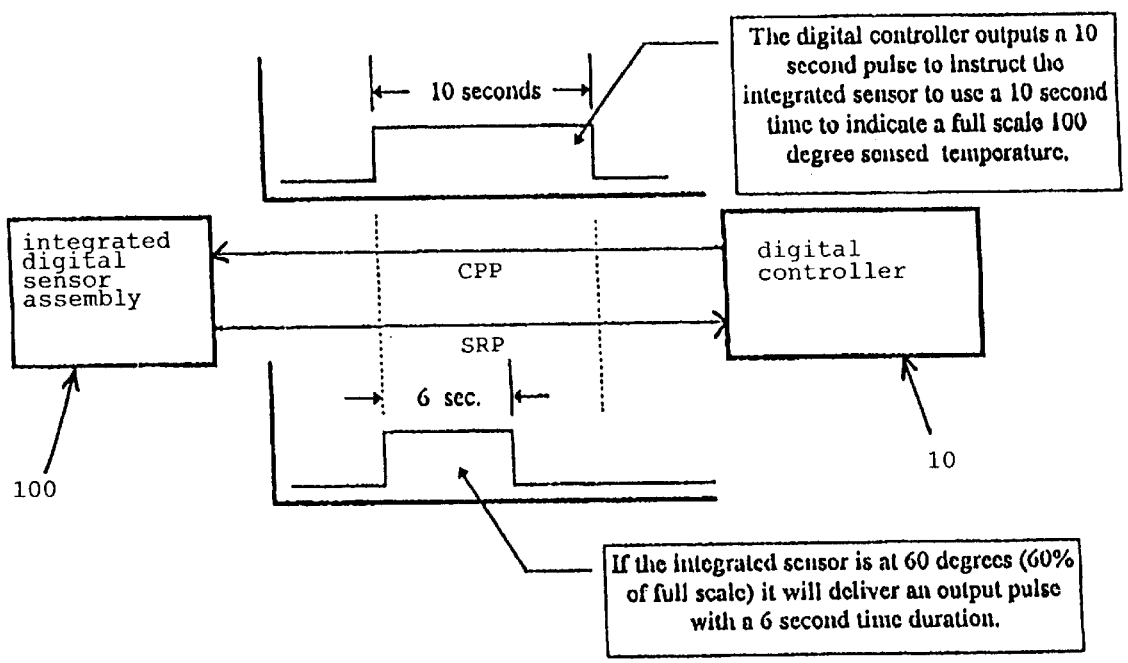
FIG. 3 is an exemplary timing diagram illustrating the relationship between the CPP and SRP signals in one form of the invention.

In a preferred form of the invention, sensor assembly 100 is constructed so that it will generate its SRP according to the following algorithm:

time duration of SRP=(Actual Sensed Value/Full Scale Sensed Value)*time duration of CPP By way of example but not limitation, and looking now at FIG. 3, where digital controller 10 sends sensor assembly 100 a CPP having a time duration of 10 seconds, and where the sensor assembly has a temperature range of 0–100 degrees, and where the sensor assembly senses a temperature of 60 degrees, i.e., 60% of the sensor assembly's full scale value, sensor assembly 100 is configured to send digital controller 10 a SRP of 6 seconds.

Thus, by measuring the time duration of the SRP and comparing it to the time duration of the CPP, the digital controller can determine the ratio of the sensor assembly's actual sensed value to the sensor assembly's full scale sensed value, and hence determine the sensor assembly's actual sensed data.

In one form of the present invention, the novel method for sensing physical conditions and reporting on the same comprises:

(1) providing sensor assembly 100;

(2) sending the CPP from digital controller 10 to sensor assembly 100, and sensing the physical condition which is to be measured by sensor assembly 100; and (3) sending the SRP from sensor assembly 100 to digital controller 10 so as to report sensor data to the digital controller.

It will be appreciated that the novel scheme used to communicate between sensor assembly 100 and digital controller 10 permits the sensor assembly to tailor the character of its SRP according to (1) the time duration of the CPP generated by the digital controller, and (2) the particular data which is to be reported by the sensor assembly. As a result, the "full scale value" of the SRP can vary anywhere from sub-milliseconds to tens of seconds. This is significant, inasmuch as it permits sensor assembly 100 to be used in conjunction with a wide range of different digital controllers, from high speed devices, which generally require fast sensor update times, to low speed devices, which generally require fairly long full scale pulses.

In connection with the foregoing, sensor assembly 100 may be configured so that it will begin sending the SRP to digital controller 10 as soon as it receives the CPP from digital controller 10.

Alternatively, sensor assembly 100 could be configured so that it will begin sending the SRP to digital controller 10 after the value read by electronic sensor 105 exceeds some pre-determined value, i.e., a "set-point". By way of example, in the case where electronic sensor 105 is a temperature sensor, sensor assembly 105 might be adapted to begin sending the SRP to digital controller 10 after the detected temperature exceeds 91 degrees C. This mode of operation may, for convenience, be characterized as a "set-point" mode of operation. In this form of operation, sensor assembly 100 would continue to issue the SRP to digital controller 10 even if the value detected by electronic sensor 105 falls below the pre-determined set-point.

If desired, sensor assembly 100 could also be configured so that it will thereafter cease sending the SRP to digital controller 10 if the value read by electronic sensor 105 falls below some pre-determined value, i.e., a "reset-point". By way of example, in the case where electronic sensor 105 is a temperature sensor, and where the sensor assembly has a set-point of 91 degrees C. and a reset-point of 80 degrees C., sensor assembly 100 would begin sending the SRP to digital controller 10 after (1) the sensor assembly receives the CPP from digital controller 10, and (2) the detected temperature exceeds the set-point of 91 degrees C. The sensor assembly would thereafter continue sending the SRP to digital controller 10 until the detected temperature falls below the pre-determined reset-point of 80 degrees C., whereupon the sensor assembly would stop sending the SRP to digital controller 10. This mode of operation may, for convenience, be referred to as a "reset-point" mode of operation.

If desired, sensor assembly 100 can also be adapted to measure the ambient temperature in which sensor assembly 100 is disposed, such that the sensor assembly can correct for any known errors in sensor readings due to operating temperature. By way of example, where electronic sensor 105 is a current sensing device, its sensitivity may be a known function of ambient operating temperature, and temperature-based errors in reported values can be corrected by the electronics of the sensor assembly. More particularly, since the electronic sensor's electronics will be subjected to substantially the same temperature as electronic sensor 105, and since the electronic sensor's electronics can easily sense such temperature (e.g., with a thermistor), the sensor assembly can correct for any temperature based errors in the sensed values.

It should also be appreciated that two or more different CPP's might be used to establish the character of the SRP. More particularly, a relatively longer CPP might be used during one phase of the operation of the sensor assembly, and a relatively shorter CPP might be used during another phase of the operation of the sensor assembly. For example, digital controller 10 might issue a relatively long CPP (calling for "low speed" information, with an associated low processing overhead) during one range of sensor values, and digital controller 10 might issue a relatively short CPP (calling for "high speed" information, with an associated high processing overhead) during another, more critical range of sensor values, so as to yield improved sensor reporting times.

Figure 4:
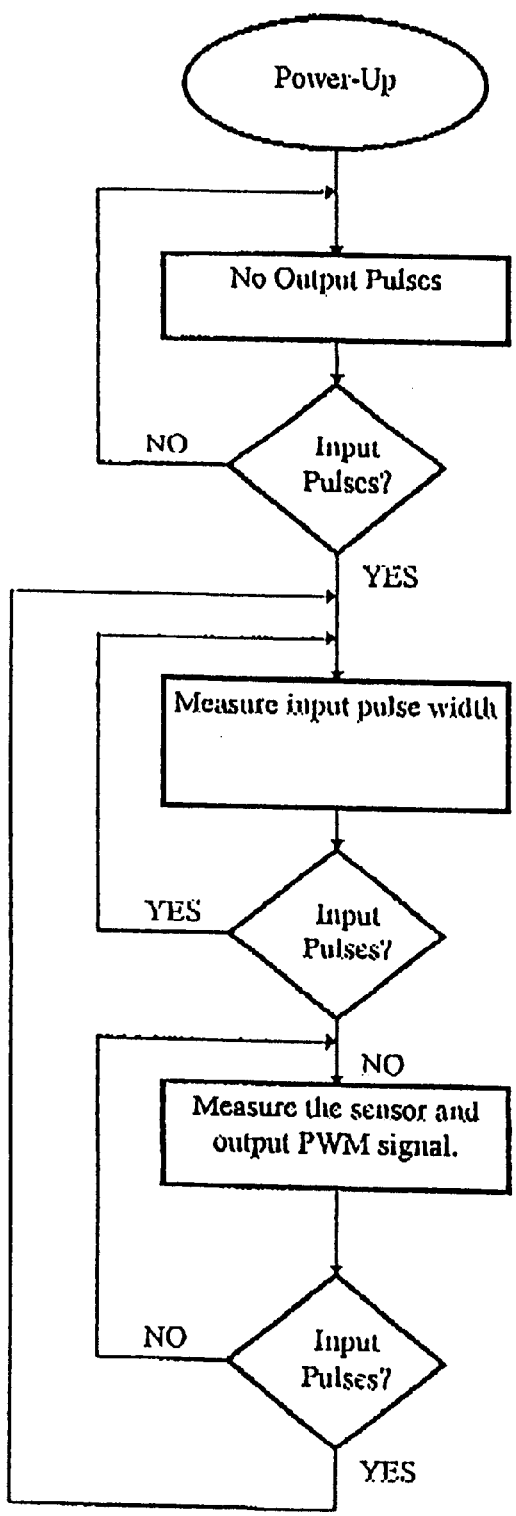
FIG. 4 is a flow chart illustrating operation of that form of the invention depicted in FIG. 3.

FIG. 4 illustrates, in flow chart form, the foregoing operation of sensor assembly 100. It should be appreciated that the flow chart of FIG. 4 applies to both (1) the situation where the CPP has a static (i.e., unchanging) nature, and (2) the situation where the CPP has a dynamic (i.e., changing) character.

Figure 5:
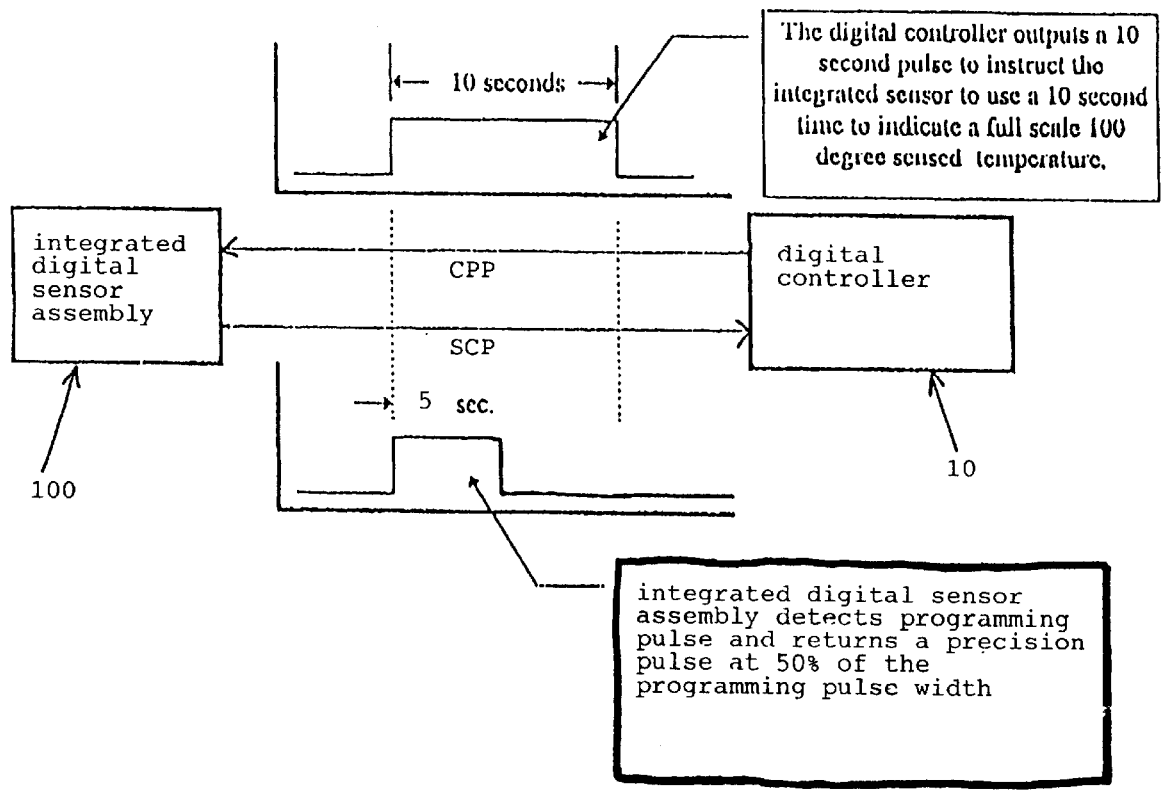
FIG. 5 is an exemplary timing diagram illustrating the relationship between the CPP signal and a "sensor confirmation pulse" (or "SCP") signal as used in another form of the invention.

FIG. 5 illustrates another form of the present invention. More particularly, as shown in FIG. 5, sensor assembly 100 may be configured so as to confirm safe receipt of the CPP by returning a sensor confirmation pulse (or "SCP") to digital controller 10 upon receipt of the CPP. Thereafter, the system can operate in the manner previously described, i.e., sensor assembly 100 will use the time duration of the CPP to generate the SRP so as to report sensor data to digital controller 10. Such a construction can be advantageous, since it permits digital controller 10 to verify that sensor assembly 10 has safely received the CPP established by digital controller 10, which CPP will thereafter be used to generate the SRP.

It should be appreciated that the SCP sent from sensor assembly 100 to digital controller 10 may have a width which is exactly equal to the width of the CPP sent from digital controller 10, or it may have a different width which is some function of the width of the CPP sent from digital controller 10. By way of example but not limitation, and looking now at FIG. 5, the SCP may have a width which is equal to 50% of the width of the CPP.

Figure 6:
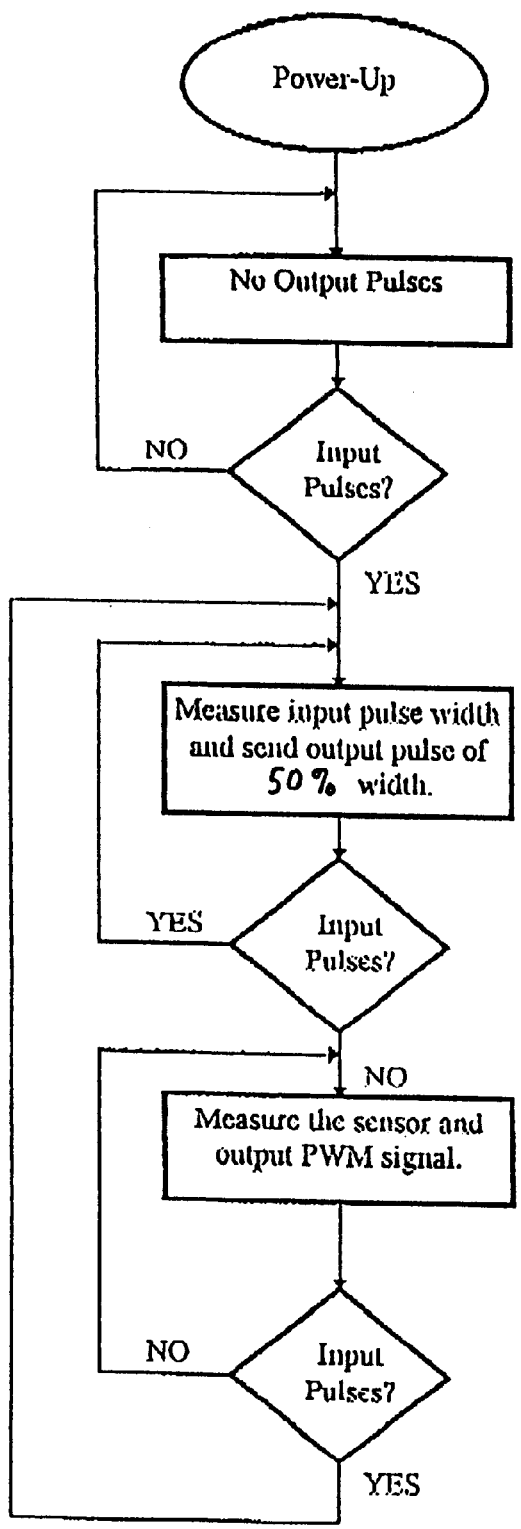
FIG. 6 is a flow chart illustrating operation of that form of the invention depicted in FIG. 5.

FIG. 6 illustrates, in flow chart form, the foregoing operation of sensor assembly 100, i.e., the situation where sensor assembly 100 sends a SCP to digital controller 10 after receiving the CPP from the digital controller.

As noted above, one important feature of the present invention is that the provision of transponder apparatus 130 permits a given sensor assembly 100 to be used in conjunction with a wide range of different digital controllers. In this respect it should also be appreciated that some digital controllers 10 may be capable of generating a series of uniform (i.e., repeatable and consistent), but not necessarily time-precise, pulses, and it may be desired to use these uniform, non-time-precise signals for the CPP. In such a situation, the construction shown in FIGS. 5 and 6 can be used with special advantage.

Figure 7:
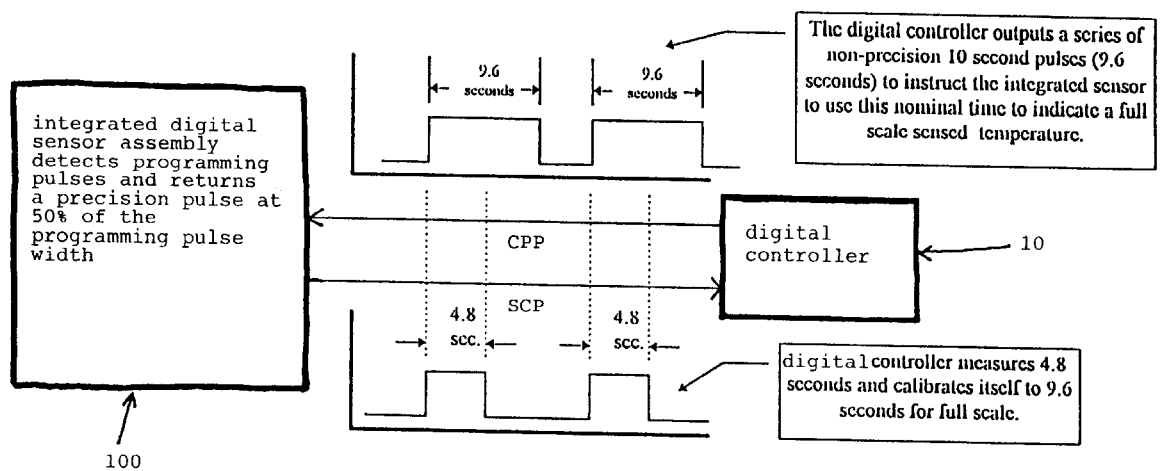
FIG. 7 is an exemplary timing diagram illustrating the relationship between the CPP and SCP signals in another form of the invention.

More particularly, and looking now at FIG. 7, in this last mentioned situation, sensor assembly 100 may be programmed to (1) time the duration of the non-time-precise CPP received from digital controller 10, (2) return a SCP having a width equal to the non-time-precise CPP, or a width equal to some function of the non-time-precise CPP (e.g., a width equal to 50% of the non-time-precise CPP, as shown in FIG. 7), and thereafter (3) generate the SRP based on the standard established by the non-time-precise CPP. In this case, digital controller 10 simply measures the length of the SCP returned by sensor assembly 100, accordingly calibrates itself for the full scale value of the SRP, and thereafter receives and interprets the SRP which is reporting actual sensor readings.

In connection with the foregoing, it should also be appreciated that where sensor assembly 100 is adapted to return a SCP to digital controller 10, it might also be adapted to utilize the aforementioned set-point mode of operation, or a reset-point mode of operation.

It should also be appreciated that, in some circumstances, the time duration of the CPP may be pre-programmed into sensor assembly 100 at the factory as a default per the user's specifications. In this mode of operation, sensor assembly 100 is adapted to automatically issue a pre-determined number of SCP's to digital controller 10 after power is applied, and then begins taking measurements and issuing SRP's. This mode of operation may, for convenience, be characterized as a "pre-programmed CPP" mode of operation.

In the foregoing description, sensor assembly 100 is described as generating a time-proportioned reporting pulse (i.e., a time-proportioned SRP) depending on the data read by electronic sensor 105. However, if desired, sensor assembly 100 could also generate a frequency-proportioned reporting pulse to report sensor data to digital controller 10.

It should be appreciated that electronic sensor 105 (FIG. 2) might comprise one of the many known electronic sensors currently available on the market. Of course, the specific electronic sensor 105 incorporated into sensor assembly 100 will depend upon the specific physical conditions which are to be sensed.

By way of example but not limitation, where sensor assembly 100 is to be used to sense temperature, electronic sensor 105 might comprise an RTD temperature sensor such as the Model PR-15 available from Omega of Connecticut, or an RTD sensor such as one of the PRTD series manufactured by RdF Corp. of New Jersey, or a thermistor temperature sensor such as the Model 1H104 sensor available from Thermodisc of Michigan, or a solid state temperature sensor such as the Model AD590 sensor manufactured by Analog Devices of Massachusetts.

By way of further example but not limitation, where sensor assembly 100 is to be used to sense electrical current, electronic sensor 105 might comprise one of the CL series of current sensors manufactured by Bicron of Connecticut, or one of the CSLA series of sensors manufactured by Honeywell of Minnesota.

By way of still further example but not limitation, where sensor assembly 100 is to be used to sense humidity, electronic sensor 105 might comprise the Model ABS-100 sensor manufactured by Ohmic Instruments of Maryland.

By way of yet further example but not limitation, where sensor assembly 100 is to be used to sense pressure, electronic sensor 105 might comprise the Model MSP 400 sensor manufactured by Measurement Specialties of New Jersey.

It should also be appreciated that digital controller 10 might comprise a custom controller, or it might comprise a PLC device, or it might comprise a micro-PLC device. Of course, the specific digital controller 10 incorporated into the overall sensor system will depend upon the nature of computer control equipment 25, among other things.

By way of example but not limitation, where digital controller 10 comprises a digital input/output card (or "I/O card") for a so-called "IBM compatible" personal computer (or "PC"), digital controller 10 might comprise one of the uCPIO series of digital I/O cards manufactured by Keithly-Metrabyte of Massachusetts, or it might comprise the Model CTM-05 counter/timer card manufactured by the aforementioned Keithly-Metrabyte, or it might comprise the PIO-16/16 digital I/O card manufactured by Contec of California, or it might comprise the PIO-48C digital I/O card manufactured by the aforementioned Contec.

By way of further example but not limitation, where digital controller 10 comprises a micro-PLC device, digital controller 10 might comprise one of the DL105 series of micro-PLC's manufactured by PLC Direct of Georgia, or it might comprise one of the KV series of micro-PLC's manufactured by Keyence of New Jersey, or it might comprise one of the FP1 series of micro-PLC's manufactured by Aromat of New Jersey.

It should also be appreciated that the sensor assembly's dedicated signal conditioner 115 (FIG. 2), its dedicated ADC 120 and its novel transponder apparatus 130 may be formed as three distinct modules which are connected together during manufacture so as to form a sort of "super module", or they may be formed as a single construct. In any case, the sensor assembly's dedicated signal conditioner 115, its dedicated ADC 120 and its novel transponder apparatus 130 together form an overall electronic device 200 (FIG. 2) which acts in the manner described herein so as to appropriately link electronic sensor 105 to digital controller 10.

By way of example but not limitation, electronic device 200 may comprise the "single construct" design shown in FIG. 8, which design will now be discussed in further detail.

Construction

Figure 8:
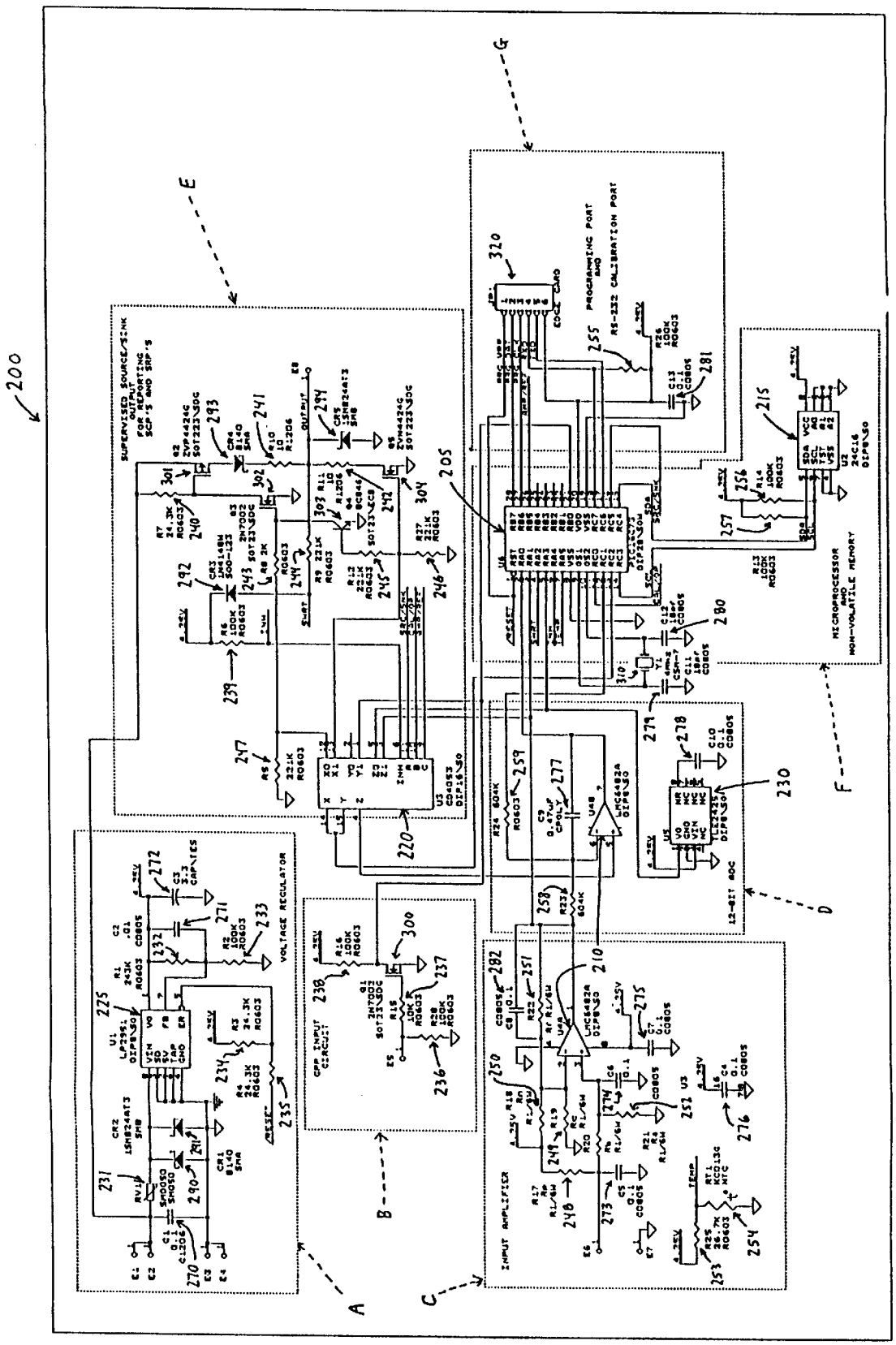
FIG. 8 is a schematic diagram illustrating one possible embodiment of the electronic circuitry included in the novel sensor assembly.

Looking now at FIG. 8, electronic device 200 can be considered, for some purposes, to comprise a voltage regulator section A, a CPP input circuit section B, an input amplifier section C, a 12-bit ADC section D, a supervised source/sink output section E for reporting SCP's and SRP's, a microprocessor and non-volatile memory section F, and a programming port and RS-232 calibration port section G.

Electronic device 200 generally comprises a microprocessor 205, a dual amplifier 210, non-volatile memory 215, an analog switch 220, a regulator/reference integrated circuit ("IC") 225, and a rail splitter 230.

By way of example but not limitation, microprocessor 205 may comprise the PIC16C73 device manufactured by MicroChip of Arizona.

By way of further example but not limitation, dual amplifier 210 may comprise the LMC6482A device manufactured by National Semiconductor of California.

By way of further example but not limitation, non-volatile memory 215 may comprise the AT24C16 device manufactured by Atmel of California.

By way of further example but not limitation, analog switch 220 may comprise the CD4053 device manufactured by Harris Computer Systems of Florida.

By way of further example but not limitation, regulator/reference IC 225 may comprise the LP2951 device manufactured by National Semiconductor of California.

By way of further example but not limitation, rail splitter 230 may comprise the TLE2426 device manufactured by Texas Instruments of Texas.

Electronic device 200 also comprises polyfuse 231; resistors 232, 233, 234, 235, 236, 237, 238, 239, 240, 241, 242, 243, 244, 245, 246, 247, 248, 249, 250, 251, 252, 253, 255, 256, 257, 258 and 259; a thermistor 254 for measuring ambient temperature; capacitors 270, 271, 272, 273, 274, 275, 276, 277, 278, 279, 280, 281 and 282; diodes 290, 291, 292, 293 and 294; transistors 300, 301, 302, 303 and 304; a crystal 310; and an edge card connector 320.

The foregoing components are connected together in the manner illustrated in FIG. 8, and the programmable components are appropriately programmed, e.g., such as with the source code listing shown in the attached Appendix A, so as to function in the manner described herein. These connected components, and their programmed operation, will be readily understood in the context of the present invention by those skilled in the art.

Still further details regarding the construction, programming and use of electronic device 200 follow.

Overview

Electronic device 200 is intended to be wedded to a family of electronic sensors 105 so as to provide a one-step solution to measurement. Electronic device 200 drives the electronic sensor and converts readings to 12-bit accuracy and provides a pulse width output for ease of remote connection. Inasmuch as electronic sensor 105 is coupled with electronic device 200 at the factory, calibration is made part of the manufacturing process, thereby removing this burden from the end user. The output pulse width is programmable by the user by providing a sample full scale pulse stream. Electronic device 200 trains on this pulse stream, subsequently outputting its own pulse stream of ratiometric pulse width (as a percentage of the sample pulse) depending on the electronic sensor's data reading. Electronic device 200 is intended to be low cost yet intelligent enough to interface to less than "premium quality" electronic sensors and still provide the stated 12-bit accuracy by using linearization and compensation. Additionally, electronic device 200 can be configured so as to allow easy offsetting and gain changes to provide full scale outputs over many ranges of sensor operation. This combination provides a faster, simpler and lower cost solution than the user is otherwise able to construct employing prior art techniques.

Theory of Conversation Operation

Electronic device 200 is constructed around a PIC16C73 microcontroller that provides the intelligence required to make high precision conversions of sensor input, linearize the readings, store calibration information, and provide the user-calibratable output pulse stream. Various support electronics provide support for offsetting sensor input and adjusting gain so that the range of interest spans the 0 to full scale range of conversion. The device also regulates a local 4.25 volt precision supply voltage from a wide range of allowable unregulated DC sources. This 4.25 volt supply voltage powers all active electronics in the device and also provides the reference to drive both the sensor and analog-to-digital conversion process. This process is designed to be ratiometric so that small changes in the reference voltage will not affect the result.

For the purposes of this discussion, the electronic sensor 105 is considered to be a resistive device, not necessarily linear, that is driven through a local resistance from the 4.25 volt supply so as to produce an output voltage that will be amplified and converted so as to make the desired measurement. In general, then, the input voltage that is measured is described by the equation:

$$Vin = Rs * Vref / (Rl + Rs)$$

where
  Rs=sensor resistance
  Rl=local divider resistance
  Vref=supply voltage (nominally 4.25V DC).
It can also be considered that the Rs range of interest varies from Rs0 to Rsfs, where $$Rsfs - Rs0 = \Delta Rs$$

and hence $\Delta Rs$ is the total resistance change for generating the sensor's full scale reading. In terms of voltage, this provides a span of $$Vin0=Rs0*Vref/(Rl+Rs0)$$

to $$Vinfs=(Rs0+\Delta Rs)*Vref/(Rl+Rs0+\Delta Rs).$$

In order to obtain a nearly 90% Vref voltage swing for resolution from zero to full scale, rail-to-rail input/output amplifiers are used and the input voltage is offset such that the zero sensor value gives something on the order of about 0.25 volt output. Gain adjustments are also provided so that when a Vinfs is input, the amplifier stage will output something on the order of about 4.00 volts.

The following describes the procedure by which electronic device 200 will infer its output pulse width from thermistor resistance changes. Because of the extreme non-linearity of thermistors, it is necessary to identify precisely where on the curve a calibration point is. Since the tolerance of the front end gain and nulling resistors and thermistor initial tolerance all contribute errors, it is necessary to separate and calibrate out their contributions. Once the gain and offset are calibrated, and a thermistor resistance for a particular temperature is found, all other thermistor values map to a temperature defined in a table of values. Temperatures between the table points are inferred by linear interpolation.

It is assumed that the following sources of error are the only contributors to variances in ADC output:

(1) thermistor resistance tolerance (assumed to be a constant factor over the temperature range of interest);
(2) null offset tolerance;
(3) gain tolerance; and
(4) amplifier offset.

Other effects that will influence accuracy over all operating conditions are Null and Gain temperature drift, changes in integrator input, high and low voltage differences from Vref and Gnd, and differences of the pull up resistor from ideal values.

Figure 8A:
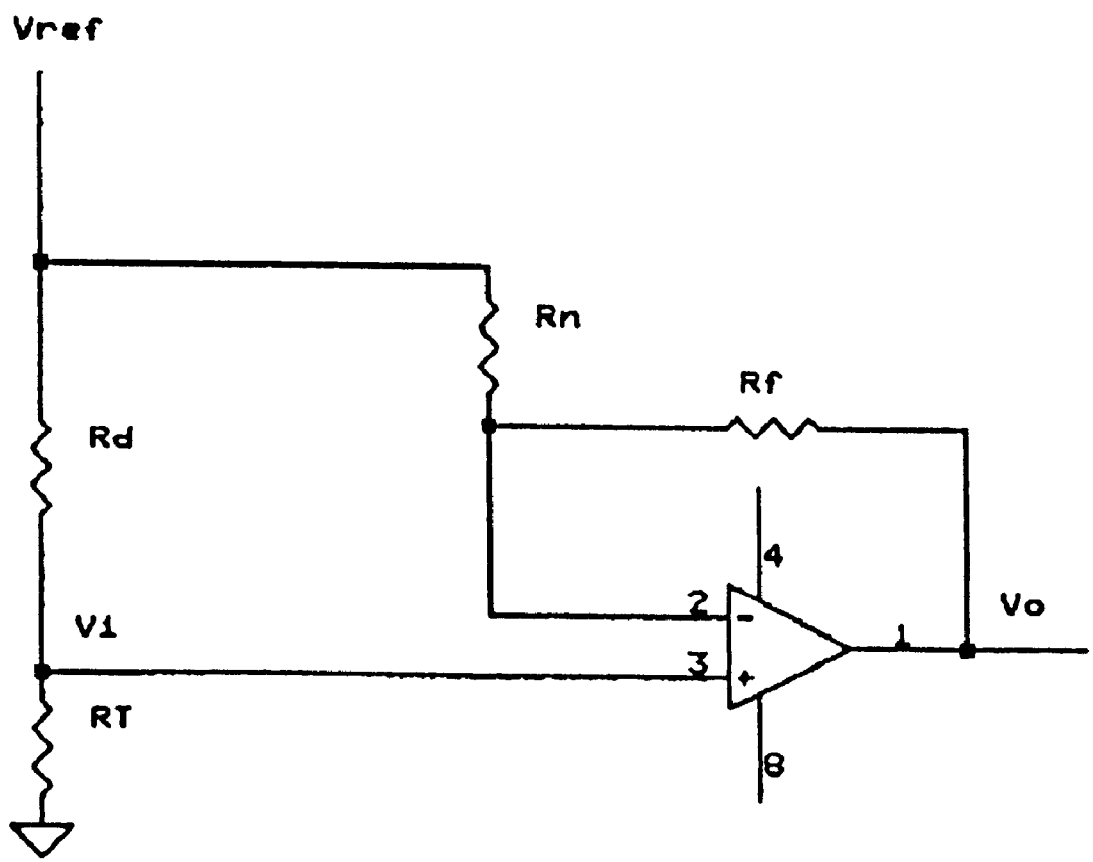
FIG. 8A is an idealized version of a portion of the circuit shown in FIG. 8.

The circuit shown in FIG. 8A gives:

$$(Vref-Vi+Voff)/Rn+(Vo-Vi+Voff)/Rf=0$$

$$Vo=Vi*(1+Rf/Rn)-Voff*(1+Rf/Rn)-Vref*Rf/Rn$$

where Voff is the offset voltage of the amplifier and $$Vi=Vref*RT/(RT+Rd)$$

where RT is the thermistor resistance.

Accordingly, $$Vo/Vref=(1+Rf/Rn)*RT/(RT+Rd)-Rf/Rn-Voff/Vref*(1+Rf/Rn)$$

Solving for RT gives:

$$RT=[Vo/Vref+Rf/Rn+(1+Rf/Rn)*Voff/Vref]*Rd/[1-Vo/Vref-(1+Rf/Rn)*Voff/Vref]$$

In terms of ADC values:

$$RT=[ADCl+65535*Rf/Rn+65535*(1+Rf/Rn)*Voff/Vref]*Rd/[ADCh-65535*(1+Rf/Rn)*Voff/Vref]$$

where ADCl and ADCh are the low and high integrator input values (i.e. ADCl=65535−ADCh).

If Rd is a precision value known to the processor, and we input a resistance instead of RT equal to Rd, we get:

$$Rf/Rn+2*(1+Rf/Rn)*Voff/Vref=[ADChd-ADCld]/65535$$

where ADChd and ADCld are the integrator input values at this resistance.

We save $$K=65535*(Rf/Rn+2*(1+Rf/Rn)*Voff/Vref)=ADChd-ADCld$$

Now in order to calibrate for the Voff term, we apply a resistance equal to the largest value thermistor input expected (Rmax). To simplify, we can refer to $65535*(1+Rf/Rn)*Voff/Vref$ as OFFSET.

Our resistance equation becomes:

$$RT=[ADCl+K-\text{OFFSET}]*Rd/[ADCh-\text{OFFSET}]$$

so for RT=Rmax, $$Rmax*ADCh-Rd*[ADCl+K]/(Rmax-Rd)=\text{OFFSET}$$

If we now apply the sensor to calibrate to the device at a controlled temperature of 0 degrees C., we get for our calculated thermistor resistance:

$$RT0=[ADCl0+K-\text{OFFSET}]*Rd/(ADCh0-\text{OFFSET})$$

Now if we have a stored table of nominal thermistor resistances at 1 degree intervals from 0 to 100 degrees, we can adjust our calculation for initial thermistor resistance tolerance by the factor:

$$\text{TABLE}[0]/RT0$$

and so now resistance is calculated for any unknown thermistor value as:

$$RT=[ADCl+K-\text{OFFSET}]*Rd*\text{TABLE}[0]/[ADCh-\text{OFFSET}]*RT0$$

The calculated resistance is compared to the table of values until it is found to fall between two consecutive entries. The number of the lower entry is equivalent to the number of degrees C. above 0. A linear interpolation is done between this value and the next higher to give the precise fractional temperature.

Using this method, we have calibrated both the circuitry and the thermistor with just three calibration points. The advantage of the large thermistor dynamic range means that without requiring a separate gain resistor (a resistor from the summing junction to ground), the Null and Gain can be calibrated with one point since both are completely defined by Rf and Rn.

The above concept also suggests a method for automatically configuring a generic electronic device 200 for any usable range of thermistor measured temperatures. If we have stored in memory a table with thermistor nominal resistances for −50 to 400 degrees C. (or as much as can be fit), we need only have a list of possible Rd values that can be used for any desired range stored to be able to calibrate the system as above. The advantage of storing the table as resistance against temperature becomes clear when it is observed that given a particular Rd value, the other gain resistor values (Rf and Rn) become immaterial as they are calibrated out of the equation. This occurs despite the fact that the voltage (and ADC values) are very dependent upon them. The appropriate stored Rd value could be selected by a combination of input pins (4 pins selects 16 values) or possibly by an on-board divider circuit that directly drives an 8-bit ADC input pin. Or the value could be entered via an RS232 port or even input pulses. The stored Rd value closest to the reading would be picked. Similarly, the appropriate temperature at which the sensor calibration point is taken could be associated with the Rd index.

Example: Assume we have a table of thermistor resistances stored at 1 degree intervals from −50 to 400 degrees C. Also assume that we wish to be able to calibrate the system over 8 100 degree ranges of temperature:

−50 to 50

0 to 100

50 to 150

100 to 200

150 to 250

200 to 300

250 to 350

300 to 400

Assume we also have a table of Rd values that will be used for each of these ranges and the sensor calibration temperature:

| temperature | exemplary resistance of sensor (in ohms) | Rd value (in ohms) |
| --- | --- | --- |
| 0 deg C. | 100.0K | 26.7K |
| 100 deg C. | 8.2 K | 2.1K |
| 200 deg C. | 652.5 | 1.96K |
| 300 deg C. | 170.0 | 1.78K |

The values Rf and Rn can be chosen at will to select the best output for the actual range that will be programmed for 0 to FS as long as the calibration temperature is in range.

The appropriate Rd is identified by the processor by one of the above methods and a resistance of Rd is applied to the thermistor input pins. The system calibrates and stores its front end constants. Then the thermistor is applied with it being held at the appropriate Cal temperature. The system then makes any adjustments for thermistor initial tolerance and stores the adjustment factor. This then defines the thermistor and front end combination and any temperature for which the amplifiers and ADC are unsaturated can be found in the look-up table.

To select the zero and FS values of the device, we can apply the appropriate zero and FS temperatures to the thermistor and then toggle the zero and FS input pins appropriately. Optionally this could be achieved by applying voltages or fixed resistors to the input instead of the thermistor. These do not need to be precision values if, when instituting the thermistor cal above, the device defaults to the full scale range selected by the Rd index (i.e., for index 2, zero would be at 50 degrees C. and FS at 150 degrees C.). To select a different range, the input (voltage or resistance) is adjusted until the output equals what it would be on the default scale. Toggle the zero input. The output now becomes zero (minimum pulse width). Adjust the voltage or resistance until the desired output is reached on the new scale and toggle the FS input. Now the unit jumps to maximum pulse width and the zero to FS temperature is calibrated. Naturally this range must be a subset of the calibrated thermistor temperature range that is within front end saturation range.

12-Bit ADC

The output of the second amplifier feeds an RC network which is also fed by the PIC16C73's "compare" output which is set up to produce a low frequency signal with variable duty cycle. In order to avoid more amplifier stages and to provide sufficient filtering, a large non-polarized capacitor is used. This capacitor is connected to Vref/2 by use of a virtual ground integrated circuit so as to remove the effects of leakage current. The duty cycle is controlled so as to balance the amplifier output so that the average capacitor voltage is Vref/2. The PIC16C73 senses the capacitor voltage through one of its standard 8-bit analog-to-digital converter inputs. A conversion takes place immediately following each positive or negative pulse transition, where the voltage excursions are at their greatest. Due to superposition, the ADC duty cycle average value is:

ADC Duty Cycle/2+Vo2/2=Vref/2 or

ADC Duty Cycle=Vref−Vo2 so that the percentage of time the modulator output is LOW is proportional to the voltage which is to be measured, Vo2. The "compare" output (CCP2) of the microcontroller is 16 bits. The process essentially works by comparing the 16 bit value (loaded with the duty cycle value) with the counter/timer T1. When a match occurs the associated output pin is switched, and an interrupt invoked. The interrupt routine will then load the "compare" register with the full scale rollover value minus the current duty cycle value.

In actuality, the process is a little more complicated. To achieve the high precision output pulses required to interface to the user's equipment, the other microcontroller "compare" function (CCP1) is used and this process resets the timer T1 when it triggers so that T1 is running at the present output pulse period. This means that, in general, T1 is not allowed to accumulate pulses for the CCP2 pulse width modulator function undisturbed. Adjustments of the duty cycle value must be made in software within the CCP1 interrupt when output pulse widths are shorter than the current duty cycle value in effect.

Of course, it should also be appreciated that the use of individual calibration signals may be replaced by a more generic RS-232 interface if desired. In this respect it should be appreciated that whenever in this application the use of individual calibration signals is discussed, such individual calibration signals may be replaced by a more generic RS-232 interface if desired.

Output Modes

The electronics device is intended to provide an output pulse width that is proportional to the measured voltage and which is also programmable by the user. The other "compare" output (CCP1) is used to provide the output pulse. This output pulse can be configured as either a frequency or a pulse width. In frequency mode, the output frequency increases from 0 to some full scale value as Vo2 increases in steps of Fmax/4095. In pulse width mode, the output pulse width increases with Vo2 from a minimum value (min_val) of max_val/4096 to the maximum pulse width max_val. In set-point mode, no output pulse is presented, however, when Vo2 exceeds some value, the output is triggered. The full scale value of the output pulse train or the set-point level may also be programmed by the user.

Programming

To program the output pulse stream, setting the pulse width, the user supplies an input pulse stream to electronic device 200 of approximately the desired full scale frequency. In frequency mode this represents the greatest frequency the device will output, while in pulse width mode it represents the minimum frequency. When the electronics device detects this input frequency, it will turn off its own output pulse stream and switch the input pulses onto its CCP1 pin and begin to measure the pulse with its capture function. When the device has measured the input pulses to its satisfaction, it will disconnect them from the CCP1 pin and begin to output pulses at precisely ½ full scale rate. The user then uses this value to calibrate its own detection method. This process continues as long as input pulses continue to be detected. When the user wishes normal operation to resume, the input pulse train is reset to a DC level. It should be noted that the user does not need to provide a precise or non-jittery pulse train to the device as long as the user calibrates on the ½ full scale value that is selected. In frequency mode, the full scale frequency can be programmed between 40 Hz and 10 KHz. The full scale pulse width in pulse width mode is 0.4096 seconds to 100 seconds.

To program the electronics device in set-point mode, the process requires additional steps. First, as in the frequency and pulse width modes, a full scale pulse train generated by the user is presented to the device (the device base type is either frequency or pulse width type). As above, when the unit finishes training, it presents a ½ full scale frequency or pulse width on its output. The value or precision of the input pulse train is insignificant as long as it falls within the acceptable full scale programmable range. When the user sees that the device has responded to full scale programming, it ceases its pulse stream by going to a low DC level and waits until the device also ceases outputting pulses (and goes to an OFF DC level). At this point, the user has 5 seconds to begin applying pulses to the device. The device will count transitions of the input pulse train. The user should supply a number of transitions equal to the desired high trigger level of the set-point from 1 to 4095. When the desired number of transitions has been applied, the user ceases pulses and stays at the current DC level until the device responds by triggering its output to the ON level. At this point, the user must again, within 5 seconds, apply any pulses desired to set the OFF trigger level to the device. The device again counts transitions and will subtract the number entered from its ON trigger point to set the point at which a triggered unit will reset as Vo2 falls (reset, "hysteresis"). When the user is finished programming the low trigger value, he should cease pulses at the current DC level until the device releases its output to the OFF state. At this point, the user has five seconds to set its pulse output level to whatever the desired resting level is before the device begins operating in its new mode. If the device, after programming, finds itself in the band between high and low trigger points, it will start in the OFF condition.

Factory Calibration

Calibration of electronics device 200 consists of selecting the firmware appropriate for the intended sensor (i.e., RTD, thermistor, strain gauge, etc.), programming the PIC16C73, setting up the mode of operation, selecting the appropriate RI for the sensor being used, connecting the sensor and programming the desired offsets and range gains, and programming the default output values.

Figure 9:
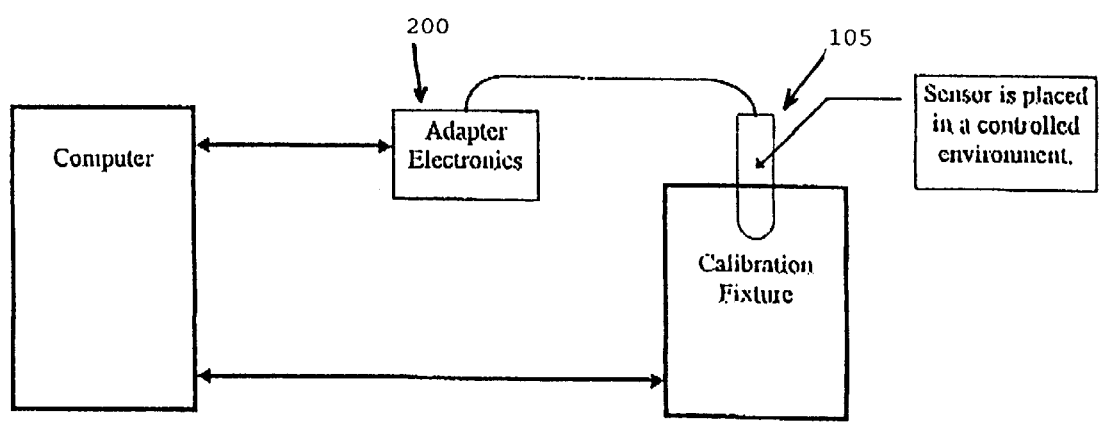
FIG. 9 is a schematic diagram illustrating factory calibration of the novel sensor assembly.

Preferably the electronics device is calibrated by using a calibration system similar to that illustrated in FIG. 9.

The PIC16C73 can be programmed in-situ so that generic sensor boards can be manufactured with only the RI value selected at test. In order to provide a device that is more easily re-calibrated in the field and that will retain any user output pulse train calibrations, a non-volatile 128×8 memory device is employed. In order to protect factory calibration data, the device memory is split into 2 blocks of 64 bytes. The lower block contains the system configuration (i.e., mode, offsets, and gain) and the zero, span, and any linearization calibrations and the default output full scale value. The firmware will only write to this area when the "Cal" pin is held low. Otherwise, if the NOVRAM write routine is called with an address in this block and the "Cal" pin is not in the low state, it will force itself through reset. The upper block contains any user calibration information including adjustments to the full scale output frequency or pulse width value or set-point and any recalibration of sensor response. Sensor recalibrations will not supplant the factory calibration but will modify them to achieve the desired accuracy. The integrity of all blocks of data will be verified with associated checksums. Again, as noted above, the use of individual calibration signals may be replaced by a more generic RS-232 interface if desired.

In order to facilitate simultaneous calibration of batches of like devices, the factory calibration will be controlled by logic levels on a header accessible at the board level or, if desired, in the aforementioned generic RS-232 interface.

The calibration of sensor assembly 100 takes place after electronic device 200 is connected to electronic sensor 105. A calibration fixture is required which can expose the sensor to one or more precisely controlled environments. In the case of a temperature sensor, the calibration device could be a controlled liquid bath which can be set to any temperature set-point within the sensor assembly's measurement range.

A computer is connected to both the calibration fixture and the digital sensor's electronics such that it controls the operation of both. The sensor assembly's electronic device 200 has an integral RS-232 port, and other data input and output lines, which allow the computer to transmit and extract information and control functions.

The computer sets the calibration fixture to a set-point within the sensor assembly's measurement range. When the calibration fixture and sensor assembly have reached a stable operating point, the computer extracts the un-calibrated data from the digital sensor. The computer then calculates factors which will reduce the sensor assembly's measurement error to within specifications and transmits this information to the digital sensor's non-volatile memory. This process can be repeated for other set-point values within the sensor assembly's measurement range.

When in normal operation, electronic device 200 uses linear interpolation or lookup tables to determine actual measured values based on raw measured data given the information saved during calibration.

User Calibration

Calibration in the field is done as follows.

A special calibration plug connects to the device calibration connector. This plug has two push button switches and a LED. When the plug is installed, the LED goes on solid. The plug "hard-wires" the device "Mode" pin to a LOW level, informing it that a user calibration is taking place. The push button switches are labeled ZERO and FS and connect to the microcontroller pins of the same name.

To calibrate, the user applies the zero condition to the sensor, waiting the appropriate time settling, and then presses and holds the ZERO switch. The device records the level and makes any necessary offset changes to bring the signal in range and then controls the LED of OFF. Any changes are recorded in the high block of NOVRAM. The full scale value can be programmed in a similar fashion using the FS switch.

Pressing and holding both switches closed simultaneously causes the device to discard all user calibration data and return to the factory calibration settings.

An alternative user calibration method involves installing the calibration plug and then supplying the device with information about the present sensor state. As in "Cal" mode above, when the calibration plug is installed the unit does not try to adjust its full scale frequency or pulse width output when it receives input pulses. Instead, an input pulse train is regarded as what the sensor should be reading at this level. The device calculates the percentage of full scale (at the present output programmed value) that the input pulses represent and associates this value with the sensor reading. New calibration values are stored in NOVRAM and the output goes to a low DC level until input pulses cease. Up to 5 such calibration points can be programmed.

To resume normal operation with the new calibration data, the calibration plug is removed.

Further Embodiments of the Invention

Figure 10:
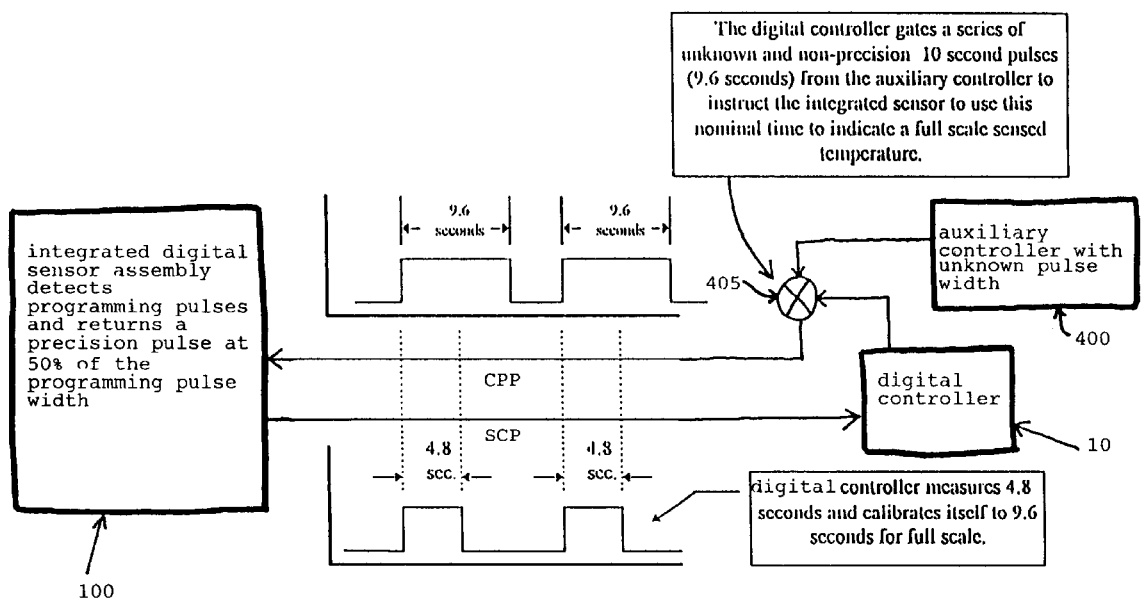
FIG. 10 is an exemplary timing diagram illustrating the relationship between the CPP and SCP signals in still another form of the invention.

In some circumstances, it may be desired to use a CPP generated by something other than digital controller 10. More particularly, and looking now at FIG. 10, there is shown a construction where an auxiliary controller 400 is used to generate the CPP, and digital controller 10 is used to control a gate 405 whereby the CPP is sent to sensor assembly 100.

Figure 11:
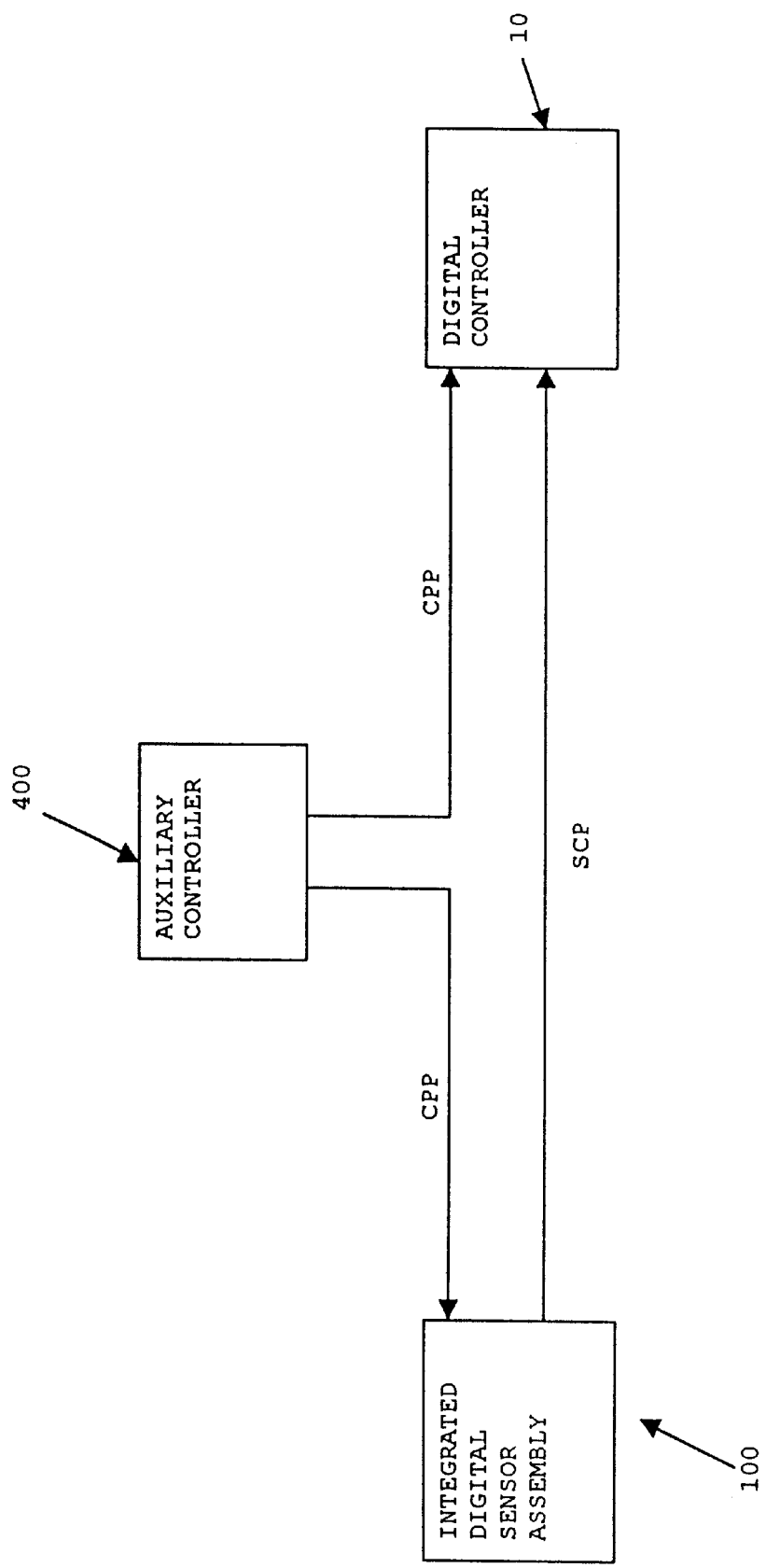
FIG. 11 is a schematic diagram illustrating yet another form of the present invention.

Still another possible embodiment is shown in FIG. 11. Here, the auxiliary controller 400 is configured to send the CPP to both sensor assembly 100 and digital controller 10. If desired, sensor assembly 100 may be configured to send the SCP to digital controller 10 to assure digital controller 10 that sensor assembly has safely received the CPP.

Figure 12:
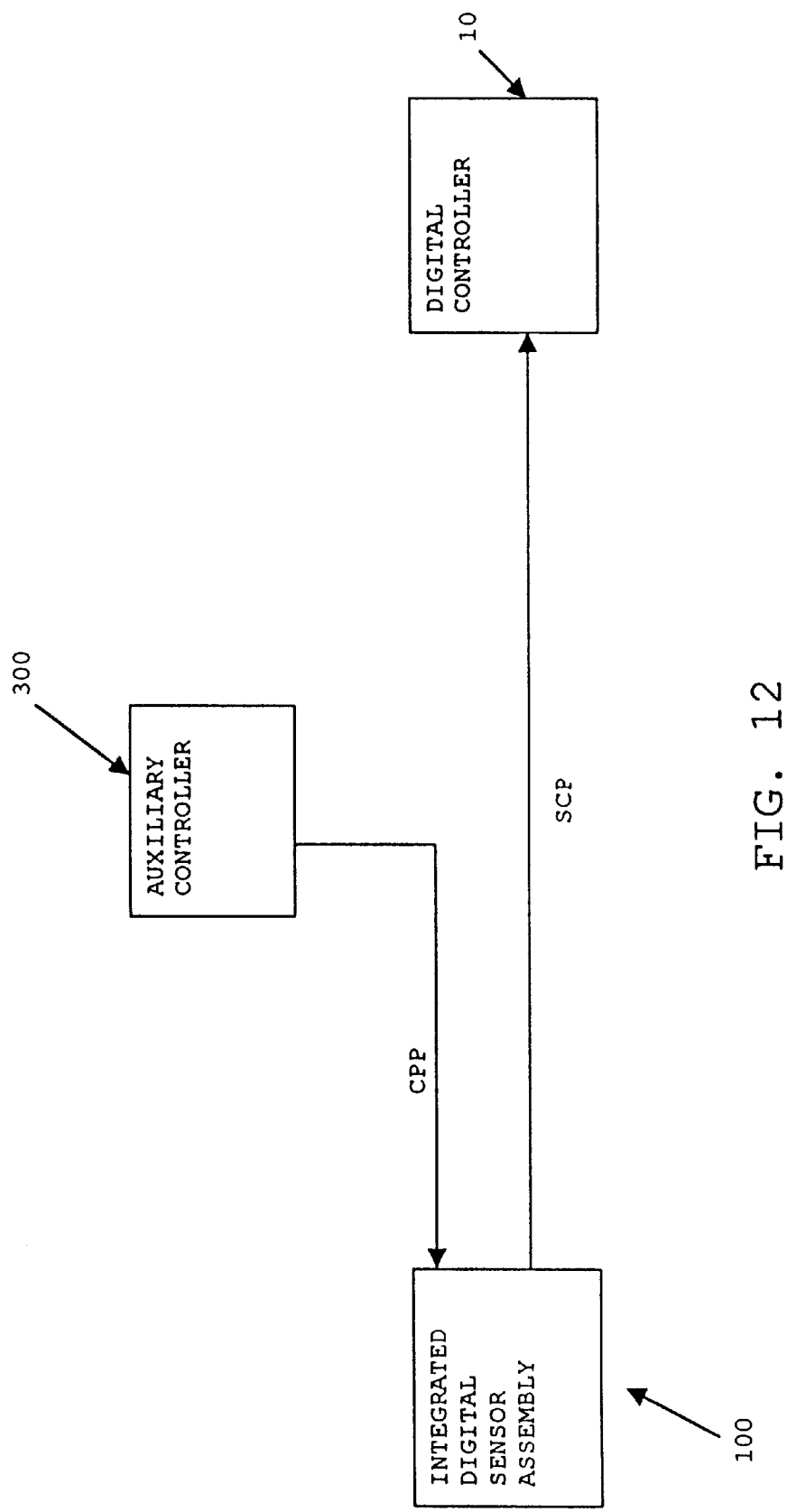
FIG. 12 is a schematic diagram illustrating still another form of the present invention.

Yet another possible embodiment is shown in FIG. 12. Here, the auxiliary controller 300 is configured to send the CPP to sensor assembly 100, but it is not configured to send the CPP to digital controller 10. In this construction, sensor assembly 100 is configured to send the SCP to digital controller 10 to inform digital controller 10 as to the basis to be used in configuring the SRP. Of course, if the SCP and the SRP are both sent from sensor assembly 100 to digital controller 10 on the same line, a scheme must be employed to identify the transition from SCP to SRP. This can be achieved by appropriate signal timing, or by the use of an intervening signal.

Figure 13:
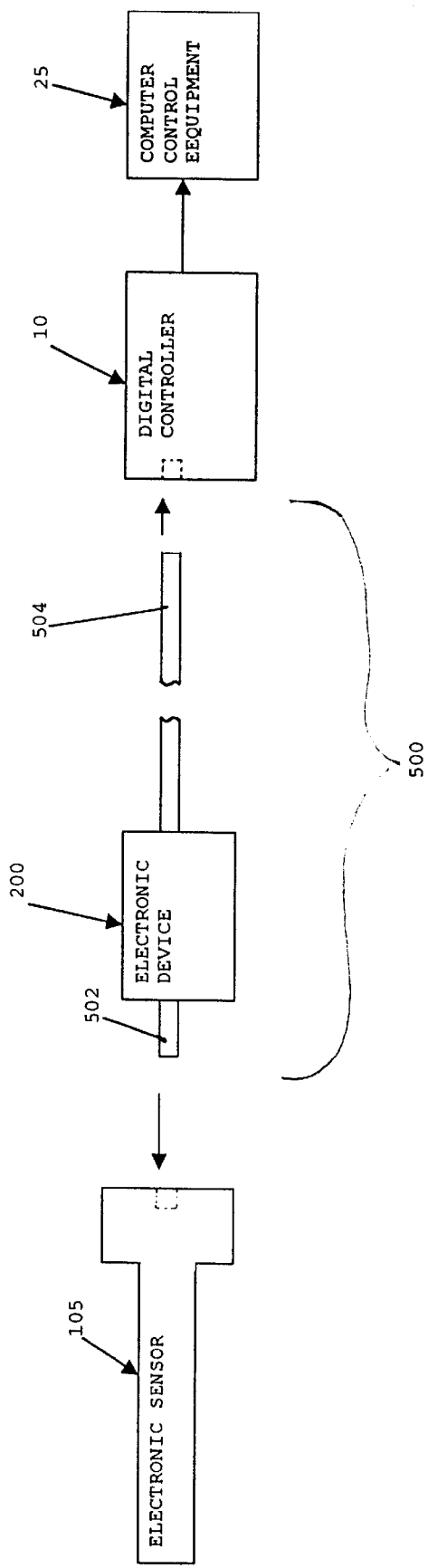
FIG. 13 is a schematic diagram illustrating another alternative form of the invention.

Looking next at FIG. 13, there is shown still another form of the invention. In this form of the invention, a cable assembly 500 is provided. Cable assembly 500 is adapted to (i) connect to electronic sensor 105 at the distal end 502 of the cable assembly, and (ii) connect to digital controller 10 at the proximal end 504 of the cable assembly. Cable assembly 500 includes electronic device 200 intermediate its length, whereby the proximal end 504 of cable assembly 500 will effectively provide the same interface junction as the proximal end of transponder apparatus 130 shown in FIG. 2. In essence, in this form of the invention, the novel sensor assembly essentially comprises electronic sensor 105 in combination with cable assembly 500, which cable assembly 500 includes electronic device 200. In this form of the invention, electronic device 200 is preferably constructed so as to have a size and density similar to the adjacent incoming and outgoing portions of the cable, whereby it will be an integral part of the cable without the need for an independent mechanical mounting or strain reliefs for the cable. Preferably electronic device 200 is placed near the distal end 502 of cable assembly 500, in close proximity to electronic sensor 105, so as to minimize stray electrical noise, help keep electronic device 200 at approximately the same temperature as electronic sensor 105, etc. By way of example, cable assembly 500 is preferably constructed so that electronic device 200 will be disposed within about a foot of electronic sensor 105. Cable assembly 500 is preferably formed so as to be environmentally sealed.

It should also be appreciated that the novel sensor assembly can be constructed so as to communicate with digital controller 10 through a variety of different transmission media. More particularly, in the embodiments discussed above, the novel sensor assembly has been discussed in the context of using an electrical signal, carried by wires, to communicate with digital controller 10. However, if desired, other transmission arrangements can also be used. For example, the novel sensor assembly can be constructed so as to send a light signal to digital controller 10, or to send a fluid pressure pulse to digital controller 10, or to send a radio signal to digital controller 10, or to send a magnetic signal to digital controller 10, or to send any other type of signal which digital controller 10 may be capable of receiving and interpreting.

Furthermore, in the foregoing disclosure, electronic device 200 is described as including an RS-232 interface for receiving communications from an associated device. However, if desired, alternative interface devices may also be incorporated into electronic device 200. By way of example but not limitation, electronic device 200 may also incorporate an RS-485 interface, an $I^2C$ interface, or a CAN Bus interface, or any other interface of the sort known in the art.

It is to be understood that the present invention is by no means limited to the particular construction disclosed herein and/or shown in the drawings, but also comprises any modifications or equivalents within the scope of any claims which may ultimately issue off this patent application.

Advantages of the Invention

Numerous advantages are obtained through the use of the present invention.

For one thing, a novel sensor assembly is provided which addresses the problems associated with the prior art.

And a novel sensor assembly is provided in which a dedicated signal conditioner and a dedicated ADC are integrated directly with an electronic sensor into a single pre-assembled and pre-calibrated package.

And a novel sensor assembly is provided in which the sensor assembly can adapt its output signal so as to properly match the specific requirements of a particular digital controller.

Also, a novel integrated digital sensor assembly is provided which can help reduce overall system development time and cost, and which can increase overall system accuracy.

Furthermore, a novel sensor assembly is provided which can be used in conjunction with a digital controller which comprises a micro-PLC device.

And a novel sensor assembly is provided which is adapted so that it can be quickly and conveniently replaced by a like sensor assembly.

Also, a novel sensor assembly is provided which can incorporate electronic sensors for sensing a wide variety of different physical conditions including, but not limited to, temperature, pressure, flow, strain, voltage, current, pH, gases, vibration, light, humidity, motion and the like.

And a novel sensor assembly is provided in which at least a portion of the sensor assembly is incorporated into the cabling connecting the electronic sensor to the digital controller.

And an improved method for sensing physical conditions and reporting on the same is provided through the present invention.

And an improved method for sensing physical conditions and reporting on the same is provided, wherein the method remains the same regardless of the particular physical condition which is being sensed and the type of sensor used to sense the same.

What is claimed is:

1. A sensor assembly comprising:

an electronic sensor;

a dedicated signal conditioner;

a dedicated analog-to-digital converter ("ADC");

said dedicated signal conditioner and said ADC being integrated directly with said electronic sensor into a single pre-assembled and pre-calibrated package;

transponder apparatus for enabling said sensor assembly to adapt its output signal so as to properly match the specific input requirements of a particular digital controller;

said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller;

said transponder apparatus is constructed so that it will generate its SRP according to the following algorithm:

time duration of $SRP$=(Actual Sensed Value/Full Scale Sensed Value)*time duration of $CPP$.

2. A sensor assembly comprising:

an electronic sensor;

a dedicated signal conditioner;

a dedicated analog-to-digital converter ("ADC");

said dedicated signal conditioner and said ADC being integrated directly with said electronic sensor into a single pre-assembled and pre-calibrated package;

transponder apparatus for enabling said sensor assembly to adapt its output signal so as to properly match the specific input requirements of a particular digital controller;

said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller; and said transponder apparatus is constructed so as to (1) first confirm safe receipt of the CPP by sending a sensor confirmation pulse (or "SCP") to the digital controller upon safe receipt of the CPP, and (2) thereafter generate the SRP to report sensor data to the digital controller.

3. A method for sensing physical conditions and reporting on the same, the method comprising:

(1) providing a sensor assembly comprising:

an electronic sensor;

a dedicated signal conditioner;

a dedicated analog-to-digital converter ("ADC");

said dedicated signal conditioner and said ADC being integrated directly with said electronic sensor into a single pre-assembled and pre-calibrated package; and transponder apparatus for enabling said sensor assembly to adapt its output signal to match the specific input requirements of a particular digital controller, with said transponder apparatus being constructed so as to measure the time duration of a programming pulse sent to said sensor assembly (the "Controller Programming Pulse", or "CPP"), and then to use the time duration of the CPP to generate a time-proportioned reporting pulse (the "Sensor Reporting Pulse", or "SRP") so as to report sensor data to the digital controller;

said transponder apparatus is constructed so as to generate its SRP according to the following algorithm:

time duration of $SRP$=(Actual Sensed Value/Full Scale Sensed Value)*time duration of $CPP$;

(2) sending the CPP to said sensor assembly, and sensing the physical condition which is to be measured by said sensor assembly; and (3) sending the SRP from said sensor assembly to the digital controller so as to report sensor data to the digital controller.

4. A method for sensing physical conditions and reporting on the same, the method comprising:

(1) providing a sensor assembly comprising:

an electronic sensor;

a dedicated signal conditioner;

a dedicated analog-to-digital converter ("ADC");

said dedicated signal conditioner and said ADC being integrated directly with said electronic sensor into a single pre-assembled and pre-calibrated package; and transponder apparatus for enabling said sensor assembly to adapt its output signal to match the specific input requirements of a particular digital controller, with said transponder apparatus being constructed so as to measure the time duration of a programming pulse sent to said sensor assembly (the "Controller Programming Pulse", or "CPP"), and then to use the time duration of the CPP to generate a time-proportioned reporting pulse (the "Sensor Reporting Pulse", or "SRP") so as to report sensor data to the digital controller;

said transponder apparatus is constructed so as to (1) first confirm safe receipt of the CPP by sending a sensor confirmation pulse (the "SCP") to the digital controller upon safe receipt of the CPP, and (2) thereafter generate the SRP to report sensor data to the digital controller;

(2) sending the CPP to said sensor assembly, and sensing the physical condition which is to be measured by said sensor assembly; and (3) sending the SRP from said sensor assembly to the digital controller so as to report sensor data to the digital controller.

5. An electronic system comprising:

a sensor assembly, said sensor assembly comprising:

an electronic sensor;

a dedicated signal conditioner;

a dedicated analog-to-digital converter ("ADC"); and transponder apparatus for enabling said sensor assembly to adapt its output signal so as to properly match the specific input requirements of said digital controller;

said dedicated signal conditioner and said ADC being integrated directly with said electronic sensor into a single pre-assembled and pre-calibrated package;

said transponder apparatus is constructed so as to generate a time-proportioned reporting pulse (the "Sensor Reporting Pulse") so as to report sensor data to the digital controller;

said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to said digital controller;

said transponder apparatus is constructed so that it will generate its SRP according to the following algorithm: time duration of SRP=(Actual Sensed Value/Full Scale Sensed Value)*time duration of CPP; and a digital controller.

6. An electronic system comprising:

a sensor assembly, said sensor assembly comprising:
 an electronic sensor;
 a dedicated signal conditioner;
 a dedicated analog-to-digital converter ("ADC"); and
 transponder apparatus for enabling said sensor assembly to adapt its output signal so as to properly match the specific input requirements of said digital controller;
 said dedicated signal conditioner and said ADC being integrated directly with said electronic sensor into a single pre-assembled and pre-calibrated package;
 said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to said digital controller;
 said transponder apparatus is constructed so that it will generate its SRP according to the following algorithm: time duration of SRP=(Actual Sensed Value/Full Scale Sensed Value)*time duration of CPP; and a digital controller.

7. An electronic system comprising:

a sensor assembly, said sensor assembly comprising:
 an electronic sensor;
 a dedicated signal conditioner;
 a dedicated analog-to-digital converter ("ADC"); and
 said dedicated signal conditioner and said ADC being integrated directly with said electronic sensor into a single pre-assembled and pre-calibrated package;
 said package is environmentally sealed;

a digital controller.

8. A sensor assembly comprising:

an electronic sensor adapted to sense a physical condition and to provide a first signal representative of the sensed physical condition, said first signal comprising a low-level, un-calibrated analog signal;

an electronic device adapted to receive said first signal and to provide a second signal representative of said first signal, said second signal comprising a high-level, calibrated digital signal of the sort required by a digital controller; and transponder apparatus for enabling said sensor assembly to adapt its output signal so as to properly match the specific input requirements of a particular digital controller;

said electronic sensor and said electronic device being integrated with one another into a single pre-assembled and pre-calibrated package;

said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller;

said transponder apparatus is constructed so that it will generate its SRP according to the following algorithm:

time duration of SRP=(Actual Sensed Value/Full Scale Sensed Value)*time duration of CPP.

9. A sensor assembly comprising:

an electronic sensor adapted to sense a physical condition and to provide a first signal representative of the sensed physical condition, said first signal comprising a low-level, un-calibrated analog signal;

an electronic device adapted to receive said first signal and to provide a second signal representative of said first signal, said second signal comprising a high-level, calibrated digital signal of the sort required by a digital controller; and transponder apparatus for enabling said sensor assembly to adapt its output signal so as to properly match the specific input requirements of a particular digital controller;

said electronic sensor and said electronic device being integrated with one another into a single pre-assembled and pre-calibrated package;

said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller;

said transponder apparatus is constructed so as to (1) first confirm safe receipt of the CPP by sending a sensor confirmation pulse (or "SCP") to the digital controller upon safe receipt of the CPP, and (2) thereafter generate the SRP to report sensor data to the digital controller.

10. A sensor assembly comprising:

an electronic sensor adapted to sense a physical condition and to provide a first signal representative of the sensed physical condition, said first signal comprising a low-level, un-calibrated analog signal; and a cable assembly, said cable assembly comprising:
 an electronic device adapted to receive said first signal and to provide a second signal representative of said first signal, said second signal comprising a high-level, calibrated digital signal of the sort required by a digital controller;
 a first connector for connecting said electronic device to said electronic sensor; and
 a second connector for connecting said electronic device to a digital controller;
 said electronic device being integrated with said first and second connectors into a single pre-assembled and pre-calibrated package;
 said electronic device is sized so as to permit it to be made as an integral part of said cable assembly without the need for an independent mechanical mounting or for strain reliefs for said cable assembly.

11. A sensor assembly comprising:

an electronic sensor adapted to sense a physical condition and to provide a first signal representative of the sensed physical condition, said first signal comprising a low-level, un-calibrated analog signal;
a cable assembly, said cable assembly comprising:
  an electronic device adapted to receive said first signal and to provide a second signal representative of said first signal, said second signal comprising a high-level, calibrated digital signal of the sort required by a digital controller;
  a first connector for connecting said electronic device to said electronic sensor; and
  a second connector for connecting said electronic device to a digital controller;
  said electronic device being integrated with said first and second connectors into a single pre-assembled and pre-calibrated package; and
transponder apparatus for enabling said sensor assembly to adapt its output signal so as to properly match the specific input requirements of a particular digital controller;
said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller;
said transponder apparatus is constructed so that it will generate its SRP according to the following algorithm:

time duration of SRP=(Actual Sensed Value/Full Scale Sensed Value)*time duration of CPP.

12. A cable assembly for use with an electronic sensor of the sort adapted to sense a physical condition and to provide a first signal representative of the sensed physical condition, said first signal comprising a low-level, un-calibrated analog signal, said cable assembly comprising:
  an electronic device adapted to receive said first signal and to provide a second signal representative of said first signal, said second signal comprising a high-level, calibrated digital signal of the sort required by a digital controller;
  a first connector for connecting said electronic device to the electronic sensor;
  a second connector for connecting said electronic device to a digital controller; and
  transponder apparatus for enabling said sensor assembly to adapt its output signal so as to properly match the specific input requirements of a particular digital controller;
  said electronic device being integrated with said first and second connectors into a single pre-assembled and pre-calibrated package;
  said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller;
  said transponder apparatus is constructed so that it will generate its SRP according to the following algorithm:

time duration of SRP=(Actual Sensed Value/Full Scale Sensed Value)*time duration of CPP.

13. A method for sensing physical conditions and reporting on the same, the method comprising:

(1) providing a sensor assembly comprising:
  an electronic sensor;
  a dedicated signal conditioner;
  a dedicated analog-to-digital converter ("ADC"); and
  transponder apparatus for enabling said sensor assembly to adapt its output signal to match the specific input requirements of a particular digital controller, with said transponder apparatus being constructed so as to measure the time duration of a programming pulse sent to said sensor assembly (the "Controller Programming Pulse", or "CPP"), and then to use the time duration of the CPP to generate a time-proportioned reporting pulse (the "Sensor Reporting Pulse", or "SRP") so as to report sensor data to the digital controller;
  said dedicated signal conditioner and said ADC being integrated directly with said electronic sensor into a single pre-assembled and pre-calibrated package;
(2) sending the CPP to said sensor assembly, and sensing the physical condition which is to be measured by said sensor assembly;
(3) sending the SRP from said sensor assembly to the digital controller so as to report sensor data to the digital controller;
(4) sending a second CPP to the sensor assembly, and sensing the physical condition which is to be measured by said sensor assembly; and
(5) sending a second SRF from said sensor assembly to the digital controller so as to report sensor data to the digital controller, the second SRP being generated as a function of the second CPP.

14. A sensor assembly comprising:
an electronic sensor;
a dedicated signal conditioner;
a dedicated analog-to-digital converter ("ADC"); and
transponder apparatus for enabling said sensor assembly to adapt its output signal so as to properly match the specific input requirements of a particular digital controller;
said dedicated signal conditioner and said ADC being integrated directly with said electronic sensor into a single pre-assembled and pre-calibrated package;
said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller;
wherein the SCP is generated as a function of the CPP.

15. A sensor assembly comprising:
an electronic sensor;
a dedicated signal conditioner;
a dedicated analog-to-digital converter ("ADC"); and
transponder apparatus for enabling said sensor assembly to adapt its output signal so as to properly match the specific input requirements of a particular digital controller;
said dedicated signal conditioner and said ADC being integrated directly with said electronic sensor into a single pre-assembled and pre-calibrated package;
said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller;

wherein the SCP is generated as a function of the CPP. transponder apparatus for enabling said sensor assembly to adapt its output signal so as to properly match the specific input requirements of a particular digital controller;

wherein the SCP has a time duration equal to one-half the time duration of the CPP.

16. A sensor assembly comprising:

an electronic sensor;

a dedicated signal conditioner;

a dedicated analog-to-digital converter ("ADC"); and transponder apparatus for enabling said sensor assembly to adapt its output signal so as to properly match the specific input requirements of a particular digital controller;

said dedicated signal conditioner and said ADC being integrated directly with said electronic sensor into a single pre-assembled and pre-calibrated package;

said transponder apparatus is constructed so as to measure the time duration of a programming pulse sent to said sensor assembly (the "Controller Programming Pulse", or "CPP"), and then to use the time duration of the CPP to generate a time-proportioned reporting pulse ("the Sensor Reporting Pulse", or "SRP") so as to report sensor data to the digital controller;

wherein the SCP is generated as a function of the CPP. transponder apparatus for enabling said sensor assembly to adapt its output signal so as to properly match the specific input requirements of a particular digital controller;

wherein the SCP has a time duration substantially equal to the time duration of the CPP.

17. A sensor assembly comprising:

an electronic sensor;

a dedicated signal conditioner;

a dedicated analog-to-digital converter ("ADC"); and transponder apparatus for enabling said sensor assembly to adapt its output signal so as to properly match the specific input requirements of a particular digital controller;

said dedicated signal conditioner and said ADC being integrated directly with said electronic sensor into a single pre-assembled and pre-calibrated package;

said transponder apparatus is constructed so as to generate a frequency-proportioned reporting pulse (the "Sensor Reporting Pulse") so as to report sensor data to the digital controller.

18. A sensor assembly comprising:

an electronic sensor;

a dedicated signal conditioner;

a dedicated analog-to-digital converter ("ADC"); and transponder apparatus for enabling said sensor assembly to adapt its output signal so as to properly match the specific input requirements of a particular digital controller;

said dedicated signal conditioner and said ADC being integrated directly with said electronic sensor into a single pre-assembled and pre-calibrated package;

said transponder apparatus is constructed so as to generate a time-proportioned reporting pulse (the "Sensor Reporting Pulse") so as to report sensor data to the digital controller;

said transponder apparatus is constructed so as to generate the SRP after the sensor data exceeds a pre-determined set-point.

19. A sensor assembly comprising:

an electronic sensor;

a dedicated signal conditioner;

a dedicated analog-to-digital converter ("ADC"); and transponder apparatus for enabling said sensor assembly to adapt its output signal so as to properly match the specific input requirements of a particular digital controller;

said dedicated signal conditioner and said ADC being integrated directly with said electronic sensor into a single pre-assembled and pre-calibrated package;

said transponder apparatus is constructed so as to generate a time-proportioned reporting pulse (the "Sensor Reporting Pulse") so as to report sensor data to the digital controller;

said transponder apparatus is constructed so as to generate the SRP after the sensor data exceeds a pre-determined set-point;

said transponder apparatus is constructed so as to not generate the SRP after the sensor data falls below a pre-determined reset-point.

20. A sensor assembly comprising:

an electronic sensor;

a dedicated signal conditioner;

a dedicated analog-to-digital converter ("ADC"); and transponder apparatus for enabling said sensor assembly to adapt its output signal so as to properly match the specific input requirements of a particular digital controller;

said dedicated signal conditioner and said ADC being integrated directly with said electronic sensor into a single pre-assembled and pre-calibrated package;

said transponder apparatus is constructed so as to generate a time-proportioned reporting pulse (the "Sensor Reporting Pulse") so as to report sensor data to the digital controller;

said transponder apparatus is constructed so as to generate the SRP as a function of a pre-programmed time duration.

21. A sensor assembly comprising:

an electronic sensor adapted to sense a physical condition and to provide a first signal representative of the sensed physical condition, said first signal comprising a low-level, un-calibrated analog signal; and a cable assembly, said cable assembly comprising:

an electronic device adapted to receive said first signal and to provide a second signal representative of said first signal, said second signal comprising a high-level, calibrated digital signal of the sort required by a digital controller;

a first connector for connecting said electronic device to said electronic sensor; and a second connector for connecting said electronic device to a digital controller;

said electronic device being integrated with said first and second connectors into a single pre-assembled and pre-calibrated package;

said electronic device is disposed in close proximity to said first connector.

22. A sensor assembly comprising:

an electronic sensor adapted to sense a physical condition and to provide a first signal representative of the sensed physical condition, said first signal comprising a low-level, un-calibrated analog signal; and a cable assembly, said cable assembly comprising:
- an electronic device adapted to receive said first signal and to provide a second signal representative of said first signal, said second signal comprising a high-level, calibrated digital signal of the sort required by a digital controller;
- a first connector for connecting said electronic device to said electronic sensor; and
- a second connector for connecting said electronic device to a digital controller;
- said electronic device being integrated with said first and second connectors into a single pre-assembled and pre-calibrated package;
- said electronic device is disposed in close proximity to said first connector;
- said electronic device is disposed within about one foot of said first connector.

23. A sensor assembly comprising:

an electronic sensor;

a dedicated signal conditioner;

a dedicated analog-to-digital converter ("ADC");

transponder apparatus for enabling said sensor assembly to adapt its output signal so as to properly match the specific input requirements of a particular digital controller; and temperature-compensating apparatus for modifying the output of said sensor assembly so as to compensate for the effect of temperature on said electronic sensor;

said dedicated signal conditioner and said ADC being integrated directly with said electronic sensor into a single pre-assembled and pre-calibrated package.

24. An electronic system comprising:

a sensor assembly, said sensor assembly comprising:
- an electronic sensor;
- a dedicated signal conditioner; and
- a dedicated analog-to-digital converter ("ADC");
- said dedicated signal conditioner and said ADC being integrated directly with said electronic sensor into a single pre-assembled and pre-calibrated package; and a digital controller, said digital controller comprising:
- a micro-PLC device.

* * * * *